United States Patent
Shankar et al.

(10) Patent No.: US 9,514,200 B2
(45) Date of Patent: *Dec. 6, 2016

(54) SYSTEMS AND USER INTERFACES FOR DYNAMIC AND INTERACTIVE SIMULTANEOUS QUERYING OF MULTIPLE DATA STORES

(71) Applicant: Palantir Technologies Inc., Palo Alto, CA (US)

(72) Inventors: Ankit Shankar, Millbrae, CA (US); Andrew Ash, Menlo Park, CA (US); Geoff Stowe, San Francisco, CA (US); Thomas Petracca, New York, NY (US); Benjamin Duffield, London (GB)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,459

(22) Filed: Jul. 31, 2015

(65) Prior Publication Data

US 2016/0034545 A1    Feb. 4, 2016

Related U.S. Application Data

(63) Continuation of application No. 14/504,103, filed on Oct. 1, 2014, now Pat. No. 9,116,975.

(Continued)

(51) Int. Cl.
G06F 7/00 (2006.01)
G06F 17/30 (2006.01)

(52) U.S. Cl.
CPC ... *G06F 17/30554* (2013.01); *G06F 17/30312* (2013.01); *G06F 17/30389* (2013.01);
(Continued)

(58) Field of Classification Search
None
See application file for complete search history.

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| AU | 2014206155 | 12/2015 |
| AU | 2014250678 | 2/2016 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Michael Hicks
(74) *Attorney, Agent, or Firm* — Knobbe, Martens, Olson & Bear LLP

(57) ABSTRACT

Embodiments of the present disclosure relate to a computer system and interactive user interfaces configured to enable efficient and rapid access to multiple different data sources simultaneously, and by an unskilled user. The unskilled user may provide simple and intuitive search terms to the system, and the system may thereby automatically query multiple related data sources of different types and present results to the user. Data sources in the system may be efficiently interrelated with one another by way of a mathematical graph in which nodes represent data sources and/or portions of data sources (for example, database tables), and edges represent relationships among the data sources and/or portions of data sources. For example, edges may indicate relationships between particular rows and/or columns of various tables. The table graph enables a compact and (Continued)

memory efficient storage of relationships among various disparate data sources.

20 Claims, 11 Drawing Sheets

Related U.S. Application Data

(60) Provisional application No. 61/893,080, filed on Oct. 18, 2013.

(52) U.S. Cl.
CPC .. *G06F 17/30395* (2013.01); *G06F 17/30427* (2013.01); *G06F 17/30477* (2013.01); *G06F 17/30545* (2013.01); *G06F 17/30566* (2013.01); *G06F 17/30625* (2013.01); *G06F 17/30958* (2013.01)

(56) References Cited

U.S. PATENT DOCUMENTS

| | | | |
|---|---|---|---|
| 5,632,009 | A | 5/1997 | Rao et al. |
| 5,670,987 | A | 9/1997 | Doi et al. |
| 5,724,575 | A | 3/1998 | Hoover et al. |
| 5,781,704 | A | 7/1998 | Rossmo |
| 5,798,769 | A | 8/1998 | Chiu et al. |
| 5,845,300 | A | 12/1998 | Comer |
| 5,872,973 | A | 2/1999 | Mitchell et al. |
| 5,897,636 | A | 4/1999 | Kaeser |
| 6,057,757 | A | 5/2000 | Arrowsmith et al. |
| 6,073,129 | A | 6/2000 | Levine et al. |
| 6,091,956 | A | 7/2000 | Hollenberg |
| 6,094,653 | A | 7/2000 | Li et al. |
| 6,161,098 | A | 12/2000 | Wallman |
| 6,167,405 | A | 12/2000 | Rosensteel, Jr. et al. |
| 6,219,053 | B1 | 4/2001 | Tachibana et al. |
| 6,232,971 | B1 | 5/2001 | Haynes |
| 6,243,717 | B1 | 6/2001 | Gordon et al. |
| 6,247,019 | B1 | 6/2001 | Davies |
| 6,279,018 | B1 | 8/2001 | Kudrolli et al. |
| 6,304,873 | B1 | 10/2001 | Klein et al. |
| 6,341,310 | B1 | 1/2002 | Leshem et al. |
| 6,366,933 | B1 | 4/2002 | Ball et al. |
| 6,369,835 | B1 | 4/2002 | Lin |
| 6,418,438 | B1 | 7/2002 | Campbell |
| 6,456,997 | B1 | 9/2002 | Shukla |
| 6,510,504 | B2 | 1/2003 | Satyanarayanan |
| 6,549,752 | B2 | 4/2003 | Tsukamoto |
| 6,549,944 | B1 | 4/2003 | Weinberg et al. |
| 6,560,620 | B1 | 5/2003 | Ching |
| 6,574,635 | B2 | 6/2003 | Stauber et al. |
| 6,581,068 | B1 | 6/2003 | Bensoussan et al. |
| 6,594,672 | B1 | 7/2003 | Lampson et al. |
| 6,631,496 | B1 | 10/2003 | Li et al. |
| 6,642,945 | B1 | 11/2003 | Sharpe |
| 6,674,434 | B1 | 1/2004 | Chojnacki et al. |
| 6,714,936 | B1 | 3/2004 | Nevin, III |
| 6,745,382 | B1 | 6/2004 | Zothner |
| 6,775,675 | B1 | 8/2004 | Nwabueze et al. |
| 6,820,135 | B1 | 11/2004 | Dingman |
| 6,828,920 | B2 | 12/2004 | Owen et al. |
| 6,839,745 | B1 | 1/2005 | Dingari et al. |
| 6,877,137 | B1 | 4/2005 | Rivette et al. |
| 6,976,210 | B1 | 12/2005 | Silva et al. |
| 6,980,984 | B1 | 12/2005 | Huffman et al. |
| 6,985,950 | B1 | 1/2006 | Hanson et al. |
| 7,036,085 | B2 | 4/2006 | Barros |
| 7,043,702 | B2 | 5/2006 | Chi et al. |
| 7,055,110 | B2 | 5/2006 | Kupka et al. |
| 7,058,648 | B1 | 6/2006 | Lightfoot et al. |
| 7,111,231 | B1 | 9/2006 | Huck et al. |
| 7,139,800 | B2 | 11/2006 | Bellotti et al. |
| 7,158,878 | B2 | 1/2007 | Rasmussen et al. |
| 7,162,475 | B2 | 1/2007 | Ackerman |
| 7,168,039 | B2 | 1/2007 | Bertram |
| 7,171,427 | B2 | 1/2007 | Witkowski |
| 7,194,680 | B1 | 3/2007 | Roy et al. |
| 7,269,786 | B1 | 9/2007 | Malloy et al. |
| 7,278,105 | B1 | 10/2007 | Kitts |
| 7,290,698 | B2 | 11/2007 | Poslinski et al. |
| 7,333,998 | B2 | 2/2008 | Heckerman et al. |
| 7,370,047 | B2 | 5/2008 | Gorman |
| 7,379,811 | B2 | 5/2008 | Rasmussen et al. |
| 7,379,903 | B2 | 5/2008 | Joseph |
| 7,426,654 | B2 | 9/2008 | Adams et al. |
| 7,451,397 | B2 | 11/2008 | Weber et al. |
| 7,454,466 | B2 | 11/2008 | Bellotti et al. |
| 7,461,158 | B2 | 12/2008 | Rider et al. |
| 7,467,375 | B2 | 12/2008 | Tondreau et al. |
| 7,487,139 | B2 | 2/2009 | Fraleigh et al. |
| 7,502,786 | B2 | 3/2009 | Liu et al. |
| 7,525,422 | B2 | 4/2009 | Bishop et al. |
| 7,529,727 | B2 | 5/2009 | Arning et al. |
| 7,529,734 | B2 | 5/2009 | Dirisala |
| 7,558,677 | B2 | 7/2009 | Jones |
| 7,574,409 | B2 | 8/2009 | Patinkin |
| 7,574,428 | B2 | 8/2009 | Leiserowitz et al. |
| 7,579,965 | B2 | 8/2009 | Bucholz |
| 7,596,285 | B2 | 9/2009 | Brown et al. |
| 7,614,006 | B2 | 11/2009 | Molander |
| 7,617,232 | B2 | 11/2009 | Gabbert et al. |
| 7,620,628 | B2 | 11/2009 | Kapur et al. |
| 7,627,812 | B2 | 12/2009 | Chamberlain et al. |
| 7,634,717 | B2 | 12/2009 | Chamberlain et al. |
| 7,703,021 | B1 | 4/2010 | Flam |
| 7,706,817 | B2 | 4/2010 | Bamrah et al. |
| 7,712,049 | B2 | 5/2010 | Williams et al. |
| 7,716,077 | B1 | 5/2010 | Mikurak |
| 7,725,530 | B2 | 5/2010 | Sah et al. |
| 7,725,547 | B2 | 5/2010 | Albertson et al. |
| 7,725,728 | B2 | 5/2010 | Ama et al. |
| 7,730,082 | B2 | 6/2010 | Sah et al. |
| 7,730,109 | B2 | 6/2010 | Rohrs et al. |
| 7,761,407 | B1 | 7/2010 | Stern |
| 7,770,100 | B2 | 8/2010 | Chamberlain et al. |
| 7,805,457 | B1 | 9/2010 | Viola et al. |
| 7,809,703 | B2 | 10/2010 | Balabhadrapatruni et al. |
| 7,814,084 | B2 | 10/2010 | Hallett et al. |
| 7,818,658 | B2 | 10/2010 | Chen |
| 7,870,493 | B2 | 1/2011 | Pall et al. |
| 7,894,984 | B2 | 2/2011 | Rasmussen et al. |
| 7,899,611 | B2 | 3/2011 | Downs et al. |
| 7,917,376 | B2 | 3/2011 | Bellin et al. |
| 7,920,963 | B2 | 4/2011 | Jouline et al. |
| 7,933,862 | B2 | 4/2011 | Chamberlain et al. |
| 7,941,321 | B2 | 5/2011 | Greenstein et al. |
| 7,962,281 | B2 | 6/2011 | Rasmussen et al. |
| 7,962,495 | B2 | 6/2011 | Jain et al. |
| 7,962,848 | B2 | 6/2011 | Bertram |
| 7,970,240 | B1 | 6/2011 | Chao et al. |
| 7,971,150 | B2 | 6/2011 | Raskutti et al. |
| 7,984,374 | B2 | 7/2011 | Caro et al. |
| 8,001,465 | B2 | 8/2011 | Kudrolli et al. |
| 8,001,482 | B2 | 8/2011 | Bhattiprolu et al. |
| 8,010,545 | B2 | 8/2011 | Stefik et al. |
| 8,015,487 | B2 | 9/2011 | Roy et al. |
| 8,024,778 | B2 | 9/2011 | Cash et al. |
| 8,036,632 | B1 | 10/2011 | Cona et al. |
| 8,041,714 | B2 | 10/2011 | Aymeloglu et al. |
| 8,103,543 | B1 | 1/2012 | Zwicky |
| 8,112,425 | B2 | 2/2012 | Baum et al. |
| 8,126,848 | B2 | 2/2012 | Wagner |
| 8,134,457 | B2 | 3/2012 | Velipasalar et al. |
| 8,145,703 | B2 | 3/2012 | Frishert et al. |
| 8,185,819 | B2 | 5/2012 | Sah et al. |
| 8,196,184 | B2 | 6/2012 | Amirov et al. |
| 8,214,361 | B1 | 7/2012 | Sandler et al. |
| 8,214,764 | B2 | 7/2012 | Gemmell et al. |
| 8,225,201 | B2 | 7/2012 | Michael |
| 8,229,902 | B2 | 7/2012 | Vishniac et al. |
| 8,229,947 | B2 | 7/2012 | Fujinaga |
| 8,230,333 | B2 | 7/2012 | Decherd et al. |

(56) References Cited

U.S. PATENT DOCUMENTS

| | | |
|---|---|---|
| 8,271,461 B2 | 9/2012 | Pike et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,498,984 B1 | 7/2013 | Hwang et al. |
| 8,504,542 B2 | 8/2013 | Chang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,646,080 B2 | 2/2014 | Williamson et al. |
| 8,676,857 B1* | 3/2014 | Adams .............. G06F 17/30958 707/706 |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,930,331 B2 | 1/2015 | McGrew et al. |
| 8,937,619 B2 | 1/2015 | Sharma et al. |
| 8,938,686 B1 | 1/2015 | Erenrich et al. |
| 8,954,410 B2 | 2/2015 | Chang et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,092,482 B2 | 7/2015 | Harris et al. |
| 9,116,975 B2 | 8/2015 | Shankar et al. |
| 9,146,954 B1 | 9/2015 | Boe et al. |
| 9,208,159 B2 | 12/2015 | Stowe et al. |
| 9,229,952 B1 | 1/2016 | Meacham et al. |
| 9,230,280 B1 | 1/2016 | Maag et al. |
| 9,280,532 B2 | 3/2016 | Cicerone |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0033848 A1 | 3/2002 | Sciammarella et al. |
| 2002/0065708 A1 | 5/2002 | Senay et al. |
| 2002/0091694 A1 | 7/2002 | Hrle et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0172014 A1 | 9/2003 | Quackenbush et al. |
| 2003/0200217 A1 | 10/2003 | Ackerman |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1* | 6/2004 | Burgoon ........... G06F 17/30536 |
| 2004/0117345 A1 | 6/2004 | Bamford et al. |
| 2004/0117387 A1 | 6/2004 | Civetta et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0148301 A1 | 7/2004 | McKay et al. |
| 2004/0163039 A1 | 8/2004 | McPherson et al. |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0289524 A1 | 12/2005 | McGinnes |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1* | 4/2006 | Vembu .............. G06F 17/30545 |
| 2006/0080316 A1 | 4/2006 | Gilmore et al. |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0149596 A1 | 7/2006 | Surpin et al. |
| 2006/0161558 A1 | 7/2006 | Tamma et al. |

(56) References Cited

U.S. PATENT DOCUMENTS

| | | |
|---|---|---|
| 2006/0184889 A1 | 8/2006 | Molander |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0050429 A1 | 3/2007 | Goldring et al. |
| 2007/0057966 A1 | 3/2007 | Ohno et al. |
| 2007/0061487 A1 | 3/2007 | Moore et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0143253 A1 | 6/2007 | Kostamaa et al. |
| 2007/0150369 A1 | 6/2007 | Zivin |
| 2007/0174760 A1 | 7/2007 | Chamberlain et al. |
| 2007/0185850 A1 | 8/2007 | Walters et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0233756 A1 | 10/2007 | D'Souza et al. |
| 2007/0240062 A1 | 10/2007 | Christena et al. |
| 2007/0266336 A1 | 11/2007 | Nojima et al. |
| 2007/0271317 A1 | 11/2007 | Carmel |
| 2007/0294643 A1 | 12/2007 | Kyle |
| 2008/0015970 A1 | 1/2008 | Brookfield et al. |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0104060 A1 | 5/2008 | Abhyankar et al. |
| 2008/0104149 A1 | 5/2008 | Vishniac et al. |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0222295 A1 | 9/2008 | Robinson et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270316 A1 | 10/2008 | Guidotti et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301378 A1 | 12/2008 | Carrie |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0031247 A1 | 1/2009 | Walter et al. |
| 2009/0037417 A1 | 2/2009 | Shankar et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0106308 A1 | 4/2009 | Killian et al. |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164387 A1 | 6/2009 | Armstrong et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172669 A1 | 7/2009 | Bobak et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0240664 A1 | 9/2009 | Dinker et al. |
| 2009/0249244 A1 | 10/2009 | Robinson et al. |
| 2009/0254970 A1 | 10/2009 | Agarwal et al. |
| 2009/0254971 A1 | 10/2009 | Herz |
| 2009/0271435 A1 | 10/2009 | Yako et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0313223 A1 | 12/2009 | Rantanen |
| 2009/0313311 A1 | 12/2009 | Hoffmann et al. |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0036831 A1 | 2/2010 | Vemuri et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0100963 A1 | 4/2010 | Mahaffey |
| 2010/0103124 A1 | 4/2010 | Kruzeniski et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0162176 A1 | 6/2010 | Dunton |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0211550 A1 | 8/2010 | Daniello et al. |
| 2010/0211618 A1 | 8/2010 | Anderson et al. |
| 2010/0228812 A1 | 9/2010 | Uomini |
| 2010/0235606 A1 | 9/2010 | Oreland et al. |
| 2010/0250412 A1 | 9/2010 | Wagner |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0313119 A1 | 12/2010 | Baldwin et al. |
| 2010/0318838 A1 | 12/2010 | Katano et al. |

(56) References Cited

U.S. PATENT DOCUMENTS

| | | |
|---|---|---|
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029498 A1 | 2/2011 | Ferguson et al. |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0153592 A1 | 6/2011 | DeMarcken |
| 2011/0161096 A1 | 6/2011 | Buehler et al. |
| 2011/0161132 A1 | 6/2011 | Goel et al. |
| 2011/0161137 A1 | 6/2011 | Ubalde et al. |
| 2011/0167105 A1 | 7/2011 | Ramakrishnan et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173619 A1 | 7/2011 | Fish |
| 2011/0181598 A1 | 7/2011 | O'Neall et al. |
| 2011/0184813 A1 | 7/2011 | Barnes et al. |
| 2011/0185316 A1 | 7/2011 | Reid et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowitz |
| 2011/0258158 A1 | 10/2011 | Resende et al. |
| 2011/0258242 A1 | 10/2011 | Eidson et al. |
| 2011/0270705 A1 | 11/2011 | Parker |
| 2011/0270812 A1 | 11/2011 | Ruby |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004904 A1 | 1/2012 | Shin et al. |
| 2012/0013684 A1 | 1/2012 | Lucia |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0116828 A1 | 5/2012 | Shannon |
| 2012/0117082 A1 | 5/2012 | Koperda et al. |
| 2012/0123989 A1 | 5/2012 | Yu et al. |
| 2012/0124179 A1 | 5/2012 | Cappio et al. |
| 2012/0131512 A1 | 5/2012 | Takeuchi et al. |
| 2012/0136804 A1 | 5/2012 | Lucia |
| 2012/0137235 A1 | 5/2012 | TS et al. |
| 2012/0144335 A1 | 6/2012 | Abeln et al. |
| 2012/0150791 A1 | 6/2012 | Willson |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330908 A1 | 12/2012 | Stowe et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0024268 A1 | 1/2013 | Manickavelu |
| 2013/0036346 A1 | 2/2013 | Cicerone |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0060742 A1 | 3/2013 | Chang et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097130 A1 | 4/2013 | Bingol et al. |
| 2013/0097482 A1 | 4/2013 | Marantz et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0318060 A1 | 11/2013 | Chang et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |

(56) References Cited

U.S. PATENT DOCUMENTS

| | | |
|---|---|---|
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149272 A1 | 5/2014 | Hirani et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0181833 A1 | 6/2014 | Bird et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0310266 A1 | 10/2014 | Greenfield |
| 2014/0316911 A1 | 10/2014 | Gross |
| 2014/0324876 A1 | 10/2014 | Konik et al. |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0344231 A1 | 11/2014 | Stowe et al. |
| 2014/0351070 A1 | 11/2014 | Christner et al. |
| 2015/0019394 A1 | 1/2015 | Unser et al. |
| 2015/0039886 A1 | 2/2015 | Kahol et al. |
| 2015/0046870 A1 | 2/2015 | Goldenberg et al. |
| 2015/0073929 A1 | 3/2015 | Psota et al. |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106347 A1 | 4/2015 | McGrew et al. |
| 2015/0112956 A1 | 4/2015 | Chang et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0212653 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0341467 A1 | 11/2015 | Lim et al. |
| 2015/0347903 A1 | 12/2015 | Saxena et al. |
| 2015/0378996 A1 | 12/2015 | Kesin et al. |
| 2016/0004667 A1 | 1/2016 | Chakerian et al. |
| 2016/0034545 A1 | 2/2016 | Shankar et al. |
| 2016/0062555 A1 | 3/2016 | Ward et al. |
| 2016/0098173 A1 | 4/2016 | Slawinski et al. |
| 2016/0147730 A1 | 5/2016 | Cicerone |

FOREIGN PATENT DOCUMENTS

| | | |
|---|---|---|
| DE | 102014103482 | 9/2014 |
| DE | 102014215621 | 2/2015 |
| EP | 0652513 | 5/1995 |
| EP | 1672527 | 6/2006 |
| EP | 2551799 | 1/2013 |
| EP | 2555126 | 2/2013 |
| EP | 2560134 | 2/2013 |
| EP | 2778977 | 9/2014 |
| EP | 2778983 | 9/2014 |
| EP | 2779082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 02/065353 | 8/2002 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2012/025915 | 3/2012 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.
"Apache HBase," <http://hbase.apache.org/> printed Sep. 14, 2011 in 1 page.
"The Apache Cassandra Project," <http://cassandra.apache.org/> printed Sep. 14, 2011 in 3 pages.
"The FASTA Program Package," fasta-36.3.4, Mar. 25, 2011, pp. 29.
Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Anonymous, "BackTult—JD Edwards One World Version Control System," printed Jul. 23, 2007 in 1 page.
Antoshenkov, Gennady, "Dictionary-Based Order-Preserving String Compression," The VLDB Journal, 1997, vol. 6, pp. 26-39.
Baker et al., "Megastore: Providing Scalable, Highly Available Storage for Interactive Services," 5th Biennial Conference on Innovative Data Systems Research (CIDR '11), Jan. 9-12, 2011, Asilomar, California, pp. 12.
Bernstein et al., "Hyder—A Transactional Record Manager for Shared Flash," 5th Biennial Conference on Innovative Data Systems Research (CIDR '11), Jan. 9-12, 2011, Asilomar, California, pp. 12.
Bluttman et al., "Excel Formulas and Functions for Dummies," 2005, Wiley Publishing, Inc., pp. 280, 284-286.
Boyce, Jim, "Microsoft Outlook 2010 Inside Out," Aug. 1, 2010, retrieved from the internet https://capdtron.files.wordpress.com/2013/01/outlook-2010-inside_outpdf.

(56) References Cited

OTHER PUBLICATIONS

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chang et al., "Bigtable: A Distributed Storage System for Structured Data", Google, Inc., OSDI'06: Seventh Symposium on Operating System Design and Implementation, Seattle, WA, Nov. 2006, pp. 14.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Conner, Nancy, "Google Apps: The Missing Manual," Sharing and Collaborating on Documents, May 1, 2008, pp. 93-97, 106-113 & 120-121.
Database Management, Charlottesville, Virginia USA, Sep. 28-30, 1994, pp. 12.
Definition "Identify" downloaded Jan. 22, 2015, 1 page.
Definition "Overlay" downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Devanbu et al., "Authentic Third-party Data Publication," 2000, pp. 19, http://www.cs.ucdavis.edu/~devanbu/authdbpub.pdf.
Donjerkovic et al., "Probabilistic Optimization of Top N Queries," Proceedings of the 25th VLDB Conference, Edinburgh, Scotland, 1999, pp. 411-422.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Dreyer et al., "An Object-Oriented Data Model for a Time Series Management System," Proceedings of the 7th International Working Conference on Scientific and Statistical.
Elmasri et al., "Fundamentals of Database Systems," 2004, Fourth Edition, pp. 455-491.
GIS-NET 3 Public—Department of Regional Planning. Planning & Zoning Information for Unincorporated La County. Retrieved Oct. 2, 2013 from http://gis.planning.lacounty.gov/GIS-NET3_Public/Viewer.html.
Goswami, Gautam, "Quite 'Writely' Said!" One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: Its Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an open RDF infrastructure for shared WEB annotations", Computer Networks 39, pp. 589-608, 2002.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Mizrachi, Ilene, "Chapter 1: GenBank: The Nuckeotide Sequence Database," The NCBI Handbook, Oct. 2002, pp. 1-14.
Niepert et al., "A Dynamic Ontology for a Dynamic Reference Work", Joint Conference on Digital Libraries, Jun. 17-22, 2007, Vancouver, British Columbia, Canada, pp. 1-10.
Nierman, "Evaluating Structural Similarity in XML Documents," 2002, 6 pages.
Olanoff, Drew, "Deep Dive with the New Google Maps for Desktop with Google Earth Integration, Its More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Palmas et al., "An Edge-Bunding Layout for Interactive Parallel Coordinates" 2014 IEEE Pacific Visualization Symposium, pp. 57-64.

(56) References Cited

OTHER PUBLICATIONS

Peng et al., "Large-scale Incremental Processing Using Distributed Transactions and Notifications" Proceedings of the 9th USENIX Symposium on Operating Systems Design and Implementation, USENIX, 2010, pp. 14.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Thomson et al., "The Case for Determinism in Database Systems," the 36th International Conference on Very Large Data Bases, Sep. 13-17, 2010, Singapore, Proceedings of the VLDB Endowment, vol. 3, No. 1, pp. 11.
Umagandhi et al., "Search Query Recommendations Using Hybrid User Profile with Query Logs," International Journal of Computer Applications, vol. 80, No. 10, Oct. 1, 2013, pp. 7-18.
Vose et al., "Help File for ModelRisk Version 5," 2007, Vose Software, pp. 349-353. [Uploaded in 2 Parts].
Wikipedia, "Federated Database System," Sep. 7, 2013, retrieved from the internet on Jan. 27, 2015 http://en.wikipedia.org/w/index.php?title=Federated_database_system&oldid=571954221.
Wollrath et al., "A Distributed Object Model for the Java System," Conference on Object-Oriented Technologies and Systems, Jun. 17-21, 1996, pp. 219-231.
Yang et al., "HTML Page Analysis Based on Visual Cues," 2001, pp. 859-864.
International Search Report and Written Opinion in Application No. PCT/US2008/054511, dated Jul. 31, 2008.
International Search Report and Written Opinion in Application No. PCT/US2009/056703, dated Mar. 15, 2010.
Notice of Allowance for U.S. Appl. No. 13/826,228 dated Mar. 27, 2015.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/616,080 dated Apr. 2, 2015.
Official Communication for Australian Patent Application No. 2014201511 dated Feb. 27, 2015.
Official Communication for Australian Patent Application No. 2014202442 dated Mar. 19, 2015.
Official Communication for Canadian Patent Application No. 2,677,464, dated Aug. 22, 2012.
Official Communication for Canadian Patent Application No. 2,677,464, dated Jan. 16, 2013.
Official Communication for Canadian Patent Application No. 2,677,464, dated Mar. 19, 2012.
Official Communication for European Application No. EP 12179096.8 dated Mar. 13, 2013.
Official Communication for European Application No. EP 12182274.6, dated Nov. 5, 2012.
Official Communication for European Application No. EP 13157474.1 dated May 28, 2013.
Official Communication for European Patent Application No. 14159464.8 dated Aug. 20, 2014.
Official Communication for European Patent Application No. 14159464.8 dated Sep. 22, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14186225.0 dated Feb. 13, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14199182.8 dated Mar. 13, 2015. 2015.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for New Zealand Application No. 616212 dated May 7, 2014.
Official Communication for New Zealand Application No. 616212 dated Oct. 9, 2013.
Official Communication for New Zealand Patent Application No. 622517 dated Apr. 3, 2014.
Official Communication for New Zealand Patent Application No. 628161 dated Aug. 25, 2014.
Official Communication for New Zealand Patent Application No. 628840 dated Aug. 28, 2014.
Official Communication for U.S. Appl. No. 13/247,987 dated Apr. 2, 2015.
Official Communication for U.S. Appl. No. 13/831,791 dated Mar. 4, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/225,006 dated Sep. 10, 2014.
Official Communication for U.S. Appl. No. 14/225,006 dated Feb. 27, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,160 dated Feb. 11, 2015.
Official Communication for U.S. Appl. No. 14/225,160 dated Oct. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/278,963 dated Jun. 30, 2015.

(56) References Cited

OTHER PUBLICATIONS

Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,599 dated Jul. 22, 2014.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,154 dated Mar. 11, 2015.
Official Communication for U.S. Appl. No. 14/306,154 dated Sep. 9, 2014.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Mar. 31, 2015.
Official Communication for U.S. Appl. No. 14/451,221 dated Apr. 6, 2015.
Official Communication for U.S. Appl. No. 14/473,552 dated Feb. 24, 2015.
Official Communication for U.S. Appl. No. 14/486,991 dated Mar. 10, 2015.
"A Word About Banks and the Laundering of Drug Money," Aug. 18, 2012, http://www.golemxiv.co.uk/2012/08/a-word-about-banks-and-the-laundering-of-drug-money/.
"Potential Money Laundering Warning Signs," snapshot taken 2003, https://web.archive.org/web/20030816090055/http://finsolinc.com/ANTI-MONEY%20LAUDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Huang et al., "Systematic and Integrative Analysis of Large Gene Lists Using David Bioinformatics Resources," Nature Protocols, 4.1, 2008, 44-57.
Thompson, Mick, "Getting Started with GEO," Getting Started with GEO, Jul. 26, 2011.
Notice of Allowance for U.S. Appl. No. 14/148,568 dated Aug. 26, 2015.
Notice of Allowance for U.S. Appl. No. 14/278,963 dated Sep. 2, 2015.
Notice of Allowance for U.S. Appl. No. 14/451,221 dated Aug. 4, 2015.
Notice of Allowance for U.S. Appl. No. 14/473,552 dated Jul. 24, 2015.
Notice of Allowance for U.S. Appl. No. 14/504,103 dated May 18, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Australian Patent Application No. 2014250678 dated Oct. 7, 2015.
Official Communication for European Patent Application No. 14158861.6 dated Jun. 16, 2014.
Official Communication for European Patent Application No. 14180432.8 dated Jun. 23, 2015.
Official Communication for European Patent Application No. 14187739.9 dated Jul. 6, 2015.
Official Communication for European Patent Application No. 14191540.5 dated May 27, 2015.
Official Communication for European Patent Application No. 15155846.7 dated Jul. 8, 2015.
Official Communication for Netherlands Patent Application No. 2013306 dated Apr. 24, 2015.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for U.S. Appl. No. 12/556,318 dated Jul. 2, 2015.
Official Communication for U.S. Appl. No. 13/247,987 dated Sep. 22, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/134,558 dated Oct. 7, 2015.
Official Communication for U.S. Appl. No. 14/225,006 dated Sep. 2, 2015.
Official Communication for U.S. Appl. No. 14/225,084 dated Sep. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/289,596 dated Apr. 30, 2015.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/306,138 dated Sep. 14, 2015.
Official Communication for U.S. Appl. No. 14/306,138 dated May 26, 2015.
Official Communication for U.S. Appl. No. 14/306,147 dated Aug. 7, 2015.
Official Communication for U.S. Appl. No. 14/306,154 dated May 15, 2015.
Official Communication for U.S. Appl. No. 14/306,154 dated Jul. 6, 2015.
Official Communication for U.S. Appl. No. 14/319,765 dated Sep. 10, 2015.

(56) References Cited

OTHER PUBLICATIONS

Official Communication for U.S. Appl. No. 14/319,765 dated Jun. 16, 2015.
Official Communication for U.S. Appl. No. 14/323,935 dated Jun. 22, 2015.
Official Communication for U.S. Appl. No. 14/326,738 dated Jul. 31, 2015.
Official Communication for U.S. Appl. No. 14/490,612 dated Aug. 18, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/580,218 dated Jun. 26, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/726,353 dated Sep. 10, 2015.
Official Communication for U.S. Appl. No. 14/734,772 dated Jul. 24, 2015.
Official Communication for U.S. Appl. No. 14/746,671 dated Sep. 28, 2015.
Official Communication for U.S. Appl. No. 14/813,749 dated Sep. 28, 2015.
About 80 Minutes, "Palantir in a Number of Parts—Part 6—Graph," Mar. 21, 2013, pp. 1-6, retrieved from the internet http://about80mintites.blogspot.nl/2013/03/palantir-in-number-of-parts-part-6-graph.html retrieved on Aug. 18, 2015.
Alur et al., "Chapter 2: IBM InfoSphere DataStage Stages," IBM InfoSphere DataStage Data Flow and Job Design, Jul. 1, 2008, pp. 35-137.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Jelen, Bill, "Excel® 2013 in Depth", Video Enhanced Edition, Chapter 21, pp. 734-750 Jan. 25, 2013.
Map Builder, "Rapid Mashup Development Tool for Google and Yahoo Maps!" http://web.archive.org/web/20090626224734/http://www.mapbuilder.net/ printed Jul. 20, 2012 in 2 pages.
"Money Laundering Risks and E-Gaming: A European Overview and Assessment," 2009, http://www.cf.ac.uk/socsi/resources/Levi_Final_Money_Laundering_Risks_egaming.pdf.
Nolan et al., "Mcarta: A Malicious Code Automated Run-Time Analysis Framework," Homeland Security, 2012 IEEE Conference on Technologies for, Nov. 13, 2012, pp. 13-17.
Palantir Technolgies, "Palantir Labs—Timeline," Oct. 1, 2010, retrieved from the internet https://www.youtube.com/watch?v=JCgDW5bru9M retrieved on Aug. 19, 2015.
Perdisci et al., "Behavioral Clustering of HTTP-Based Malware and Signature Generation Using Malicious Network Traces," USENIX, Mar. 18, 2010, pp. 1-14.
Quest, "Toad for Oracle 11.6—Guide to Using Toad," Sep. 24, 2012, pp. 1-162.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Symantec Corporation, "E-Security Begins with Sound Security Policies," Announcement Symantec, Jun. 14, 2001.
"Using Whois Based Geolocation and Google Maps API for Support Cybercrime Investigations," http://wseas.us/e-library/conferences/2013/Dubrovnik/TELECIRC/TELECIRC-32.pdf.
Wikipedia, "Mobile Web," Jan. 23, 2015, retrieved from the internet on Mar. 15, 2016 https://en.wikipedia.org/w/index.php?title=Mobile Web&oldld=643800164.
Wright et al., "Palantir Technologies VAST 2010 Challenge Text Records—Investigations into Arms Dealing," Oct. 29, 2010, pp. 1-10, retrieved from the internet http://hcll2.cs.umd.edu/newvarepository/VAST520Challenge%202010/challenges/MC1%20-%20Investigations%20into%20Arms%20Dealing/entries/Palantir%20Technologies/ retrieved on Aug. 20, 2015.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 13/196,788 dated Dec. 18, 2015.
Notice of Allowance for U.S. Appl. No. 13/247,987 dated Mar. 17, 2016.
Notice of Allowance for U.S. Appl. No. 14/326,738 dated Nov. 18, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/734,772 dated Apr. 27, 2016.
Notice of Allowance for U.S. Appl. No. 14/746,671 dated Jan. 21, 2016.
Notice of Allowance for U.S. Appl. No. 14/849,454 dated May 25, 2016.
Notice of Allowance for U.S. Appl. No. 14/923,364 dated May 6, 2016.
Notice of Allowance for U.S. Appl. No. 14/948,009 dated May 6, 2016.
Official Communication for European Patent Application No. 14197938.5 dated Apr. 28, 2015. 2015.
Official Communication for European Patent Application No. 15155845.9 dated Oct. 6, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 15175106.2 dated Nov. 5, 2015.
Official Communication for European Patent Application No. 15175151.8 dated Nov. 25, 2015. 2015.
Official Communication for European Patent Application No. 15183721.8 dated Nov. 23, 2015.
Official Communication for European Patent Application No. 16152984.7 dated Mar. 24, 2016. 2016.
Official Communication for Netherlands Patent Application No. 2012436 dated Nov. 6, 2015.
Official Communication for Netherlands Patent Application No. 2012437 dated Sep. 18, 2015.
Official Communication for New Zealand Patent Application No. 622513 dated Apr. 3, 2014.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 14/196,814 dated May 5, 2015.
Official Communication for U.S. Appl. No. 14/306,138 dated Mar. 17, 2016.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Jun. 3, 2016.

(56) References Cited

OTHER PUBLICATIONS

Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/319,765 dated Feb. 1, 2016.
Official Communication for U.S. Appl. No. 14/578,389 dated Oct. 21, 2015.
Official Communication for U.S. Appl. No. 14/578,389 dated Apr. 22, 2016.
Official Communication for U.S. Appl. No. 14/580,218 dated Jun. 7, 2016.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/645,304 dated Jan. 25, 2016.
Official Communication for U.S. Appl. No. 14/726,211 dated Apr. 5, 2016.
Official Communication for U.S. Appl. No. 14/734,772 dated Oct. 30, 2015.
Official Communication for U.S. Appl. No. 14/746,671 dated Nov. 12, 2015.
Official Communication for U.S. Appl. No. 14/841,338 dated Feb. 18, 2016.
Official Communication for U.S. Appl. No. 14/874,690 dated Jun. 1, 2016.
Official Communication for U.S. Appl. No. 14/874,690 dated Dec. 21, 2015.
Official Communication for U.S. Appl. No. 14/948,009 dated Feb. 25, 2016.
Official Communication for U.S. Appl. No. 14/961,830 dated May 20, 2016.
Official Communication for U.S. Appl. No. 14/996,179 dated May 20, 2016.
Restriction Requirement for U.S. Appl. No. 13/839,026 dated Apr. 2, 2015.
Official Communication for European Patent Application No. 14189344.6 dated Feb. 29, 2016.

* cited by examiner

SYSTEMS AND USER INTERFACES FOR DYNAMIC AND INTERACTIVE SIMULTANEOUS QUERYING OF MULTIPLE DATA STORES

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 14/504,103, filed Oct. 1, 2014, and titled "SYSTEMS AND USER INTERFACES FOR DYNAMIC AND INTERACTIVE SIMULTANEOUS QUERYING OF MULTIPLE DATA STORES," which application claims benefit of U.S. Provisional Patent Application No. 61/893,080, filed Oct. 18, 2013, and titled "TABLE GRAPH." The entire disclosure of each of the above items is hereby made part of this specification as if set forth fully herein and incorporated by reference for all purposes, for all that it contains.

TECHNICAL FIELD

Embodiments of present disclosure relate to systems and techniques for accessing one or more databases in substantially real-time to provide information in an interactive user interface. More specifically, embodiments of the present disclosure relate to user interfaces for automatically and simultaneously querying multiple different data sets and/or different electronic collections of data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditional database queries are generated and used by skilled computer programmers to access data from a data source, such as a database. Traditional database queries are useful in many fields (for example, scientific fields, financial fields, political fields, and/or the like). Typically, a computer programmer must determine the proper format for the query based on the type of database accessed, and must determine the parameters of the query users or analysts that are familiar with the requirements of the data needed. Some man-machine interfaces for generating reports in this manner are software development tools that allow a computer programmer to write and test computer programs. Following development and testing of the computer program, the computer program must be released into a production environment for use. Thus, this approach for generating queries may be inefficient because an entire software development life cycle (for example, requirements gathering, development, testing, and release) may be required even if only one element of the query requires changing, or one aspect of the database has changed. Furthermore, this software development life cycle may be inefficient and consume significant processing and/or memory resources.

Further, traditional queries must be formatted specifically as required by the type of data source accessed. Accordingly, traditional methods of database querying have difficulties with handling queries to various types of data sources at the same time.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a computer system and interactive user interfaces configured to enable efficient and rapid access to multiple different data sources simultaneously, and by an unskilled user. For example, the unskilled user may provide simple and intuitive search terms to the system, and the system may thereby automatically query multiple related data sources of different types and present results to the user. Accordingly, the system may enable efficient unskilled user interactions with complex and disparate data sources, and efficient presentation of data (including search results) to the user.

In various embodiments, data sources in the system may be efficiently interrelated with one another by way of a mathematical graph (referred to herein as a "table graph") in which nodes represent data sources and/or portions of data sources (for example, database tables), and edges represent relationships among the data sources and/or portions of data sources. For example, edges may indicate relationships between particular rows and/or columns of various tables. The table graph enables a compact and memory efficient storage of relationships among various disparate data sources. By comparison to previous methods, in which data from disparate sources of different types were usually re-copied to common data sources and/or updated to a common type, the present disclosure describes a system in which these steps need not be performed, and thus the system is more efficient from both processor usage and memory usage perspectives.

Further, embodiments of the present disclosure relate to a computer system designed to provide interactive, graphical user interfaces (also referred to herein as "user interfaces") for enabling non-technical users to quickly and dynamically generate, edit, and update search queries. The user interfaces are interactive such that a user may make selections, provide inputs, and/or manipulate outputs. In response to various user inputs, the system automatically accesses one or more table graphs, formulates necessary database queries, traverses and queries associated data sources, obtains search results, and/or displays the search results to the user.

Various embodiments of the present disclosure enable search query generation and display in fewer steps, result in faster creation of outputs (such as search results), consume less processing and/or memory resources than previous technology, permit users to have less knowledge of programming languages and/or software development techniques, and/or allow less technical users or developers to create outputs (such as search results) than previous systems and user interfaces. Thus, in some embodiments, the user interfaces described herein are more efficient as compared to previous user interfaces, and enable the user to cause the system to automatically access and query multiple different data sources.

In some embodiments of the present disclosure, user interfaces are generated that enable a user to efficiently relate various different data sources in a mathematical graph.

In some embodiments, the system may automatically perform queries of data sources related in the table graph in parallel. Accordingly, the present system may be even more efficient over previous systems as the table graph enables parallel and automatic querying of multiple data sources so as to provide search results to the user with even greater speed and frees up processor resources for other tasks.

Further, as described herein, in some embodiments the system may be configured and/or designed to generate user interface data useable for rendering the various interactive user interfaces described. In these embodiments, the user interface data may be used by the system, and/or another computer system, device, and/or software program (for example, a browser program), to render the interactive user interfaces. The interactive user interfaces may be displayed on, for example, electronic displays (including, for example, touch-enabled displays).

According to an embodiment, a search system is disclosed that is configured to execute a search query, the search system comprising: one or more computing devices having hardware processors configured to execute instructions in order to: access a first data store of a first type storing at least a first data table; access a second data store of a second type different than the first type, the second data store storing at least a second data table; execute a table graph having a first node associated with the first data table, a second node associated with the second data table, and a link between the first node and the second node, the link indicating a first field of the first data table that is associated with a second field of the second data table, said executing comprising: looking up first information associated with a search query in the first data store; look up second information associated with the first information in the second data store; provide the second information for display or processing by the search system.

According to an aspect, at least one of the first field and the second field are full-text searchable.

According to another aspect, the link between the first node and the second node is a bi-directional link.

According to yet another aspect, the first type and the second type each include one or more of a relational data store, an object-oriented data store, a proprietary data store, a file-based data store, a hierarchical data store, a network data store, and an elastic-search data store.

According to another aspect, the table graph is executed via an application programming interface configured to format the second information as one or more data objects, wherein the data objects further comprise attributes and values defined by a user.

According to yet another aspect, the search query includes one or more regular expression rules.

According to another aspect, the table graph further comprises a third node associated with a third data table and wherein executing the table graph further comprises concurrently looking up the first information in the first data table and looking up a third information in the third data table.

According to yet another aspect, the lookups in the first data table and the third data tables are executed concurrently in response to the one or more computing devices automatically determining that the lookups are suitable for concurrent execution based on at least one of: query dependency, query complexity, history of query execution duration, usage statistics of the first, second, and/or third data stores, and/or predicted usage demand of the first, second, and third data stores.

According to another embodiment, a table graph system is disclosed that is configured to electronically communicate with at least one data store, the table graph system comprising: one or more physical computing devices having hardware processors configured to execution instructions in order to: receive instructions to add a first data table as a first node in a table graph; receive instructions to add a second data table as a second node in the table graph, wherein the first data table and the second data table are of different types; upon receiving instructions to add a relationship between the first and second nodes, add the relationship, wherein the relationship indicates a first field of the first data table is to be associated with a second field of the second data table, wherein the table graph is executable in order to access data stored in the first data table and subsequently data in the second data table based at least partly on the data stored in the first data table.

According to an aspect, the one or more physical computing devices are further configured to: receive instructions to add a third node linked with the first node and/or the second node; receive instructions to indicate the first node and the third node as concurrently processable, wherein the first node and the third node are executable concurrently in response to execution of the table graph.

According to another aspect, the one or more physical computing devices are further configured to: receive instructions to add a third node linked with the first node and/or the second node; receive instructions to execute at least two of the nodes concurrently; automatically determine an order of executing the at least two of the nodes concurrently.

According to yet another aspect, the one or more physical computing devices are further configured to automatically add one or more relationships between the first and second nodes.

According to another aspect, the one or more physical computing devices are further configured to receive instructions to change the relationship between the first and second nodes from a one-directional link to a bi-directional link.

According to yet another aspect, the first data table and the second data table are located remotely from each other.

DETAILED DESCRIPTION OF CERTAIN EMBODIMENTS

Terms

Figure 1:
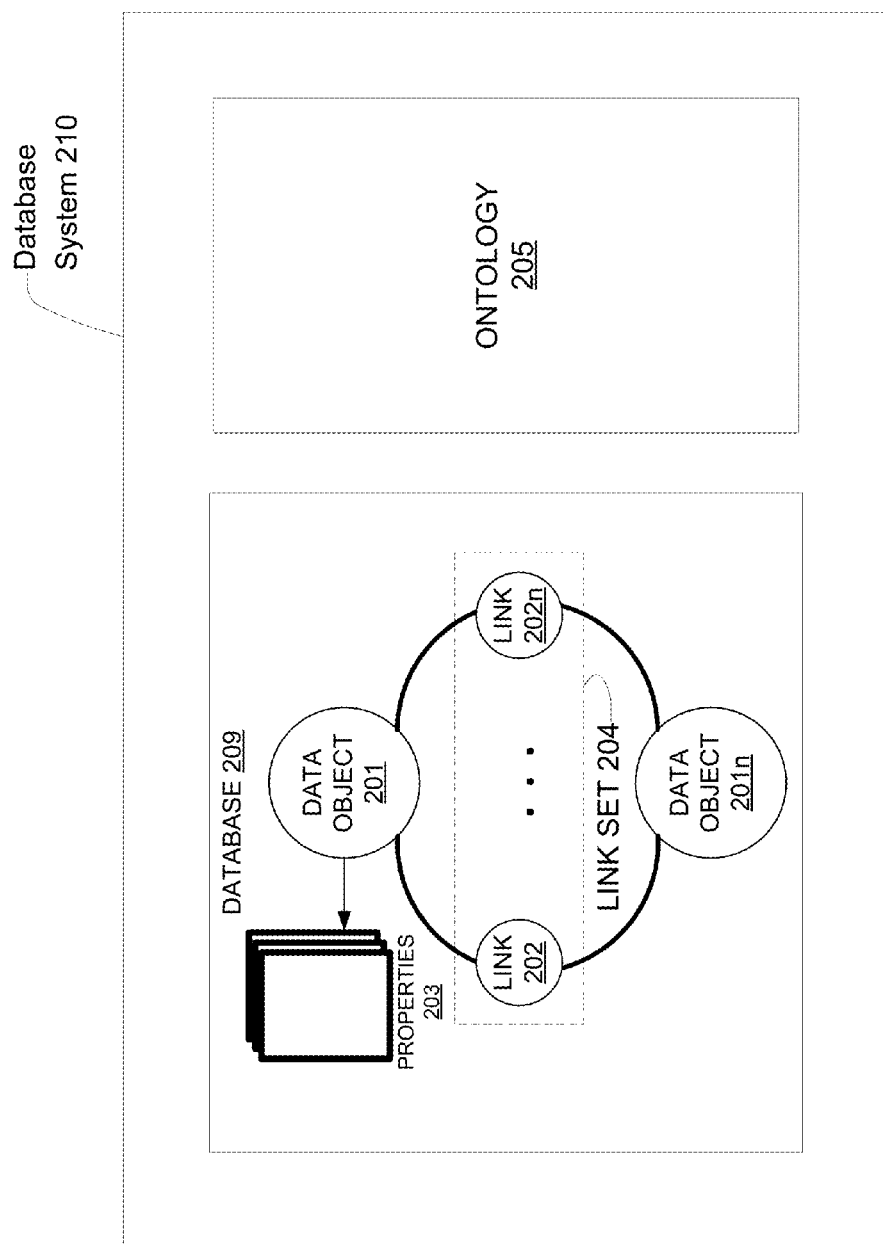
FIG. 1 illustrates one embodiment of a database system using an ontology.

In order to facilitate an understanding of the systems and methods discussed herein, a number of terms are defined below. The terms defined below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others. It is also called a data store or a data structure herein.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., person, event, or document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Table Graph: Set of multiple nodes and edges between two or more of the nodes. A node in a table graph may represent a data table or a portion of a data table. An edge in a table graph may represent a relationship between two nodes in the table graph. A relationship may represent, for example, a mapping between a data field of a node and a data field of another node.

Object Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

FIG. 1 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US $30.00 (e.g., a property of type "currency") taking place on 3/27/2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "person" data object A may be connected to "person" data object B by a "Child Of" relationship (where "person" data object B has an asymmetric "Parent Of" relationship to "person" data object A), a "Kin Of" symmetric relationship to "person" data object C, and an asymmetric "Member Of" relationship to "Organization" data object X. The type of relationship between two data objects may vary depending on the types of the data objects. For example, "person" data object A may have an "Appears In" relationship with "Document" data object Y or have a "Participate In" relationship with "Event" data object E. As an example of an event connection, two "person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 2:
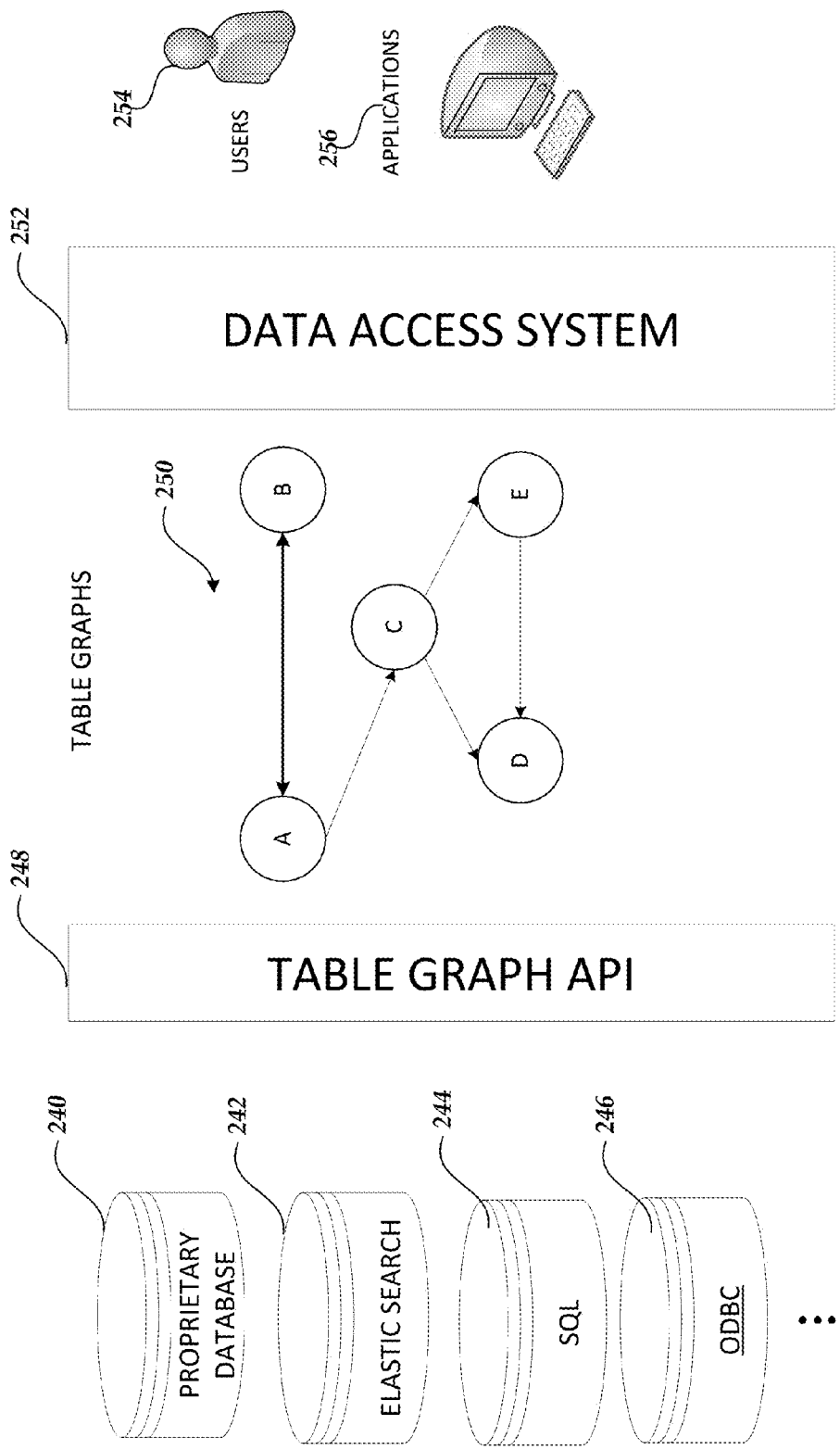
FIG. 2 illustrates one embodiment of a system for creating and accessing a table graph.

FIG. 2 is a block diagram illustrating one embodiment of a system for creating and accessing a table graph. A table graph, as used herein, defines relationships between multiple data tables from one or more data sources. The data table, or a portion of a data table, may be represented as nodes and the relationships between nodes as edges between/among two or more of the nodes. The edges (e.g., relationships) between two nodes may represent, for example, a mapping between particular data fields of nodes.

As illustrated in FIG. 2, a variety of database types may be data sources of a table graph. In the embodiment of FIG. 2, a table graph API 248 is configured to interface between the table graph 250 and multiple data sources, such as the data sources illustrated in FIG. 2, including a proprietary database 240, an elastic search database 242, a SQL database 244, an ODBC database 246, an object-oriented database (not shown in this figure), a file-based data store (not shown in this figure), a key-value store (not shown in this figure) and so forth. The table graph API 248 is capable of parsing data from various heterogeneous databases using one or more parsers and/or transformers. In some embodiments, a parser may communicate with a data source, such as an external data store, an internal data store, a proprietary database, etc., and parse the data received from the data source. In some embodiments, a transformer will further transform the data into a format that can be easily read by the table graph API 248, such as an object or another type of data. Depending on the embodiment, if there is an unspecified data source that the table graph API 248 has not previously interacted with, the table graph API 248 may first automatically detect or determine a set of rules to parse data from the unspecified source, and/or a user may manually provide translation data, so that data sources of that type may later be accessed by table graphs.

The data access system 252 may be used to generate table graphs, such as table graph 250. Users such as data analysts, database administrators, IT administrators, testing engineers, QA engineers, database and/or software developers, who have sufficient privilege to interact with the data access system 252 may generate table graphs. They may also share the generated table graphs with other end users, analysts, engineers, administrators, and so forth. An end user, a data analyst, or other users who do not have to be familiar with the underlying system, may be able to easily interact with table graphs through the data access system 252.

In the example in FIG. 2, a user 254 may, through the data access system 252, submit a request to add a first data table as a first node in a table graph 250. The user 254 may further add other data tables as nodes in the table graph 250. The user 254 may also specify set of relationships to add between the tables as edges of the table graph. In the example of table graph 250, five nodes A, B, C, D, and E, which may each be associated with different tables possibly from multiple data sources (or some may represent a common table) are added to table graph 250. The edge between nodes A and B is a bi-directional edge, where the direction(s) of edges indicate the direction of data flow between nodes. The other edges in the table graph 250 are one directional edges. A bi-directional edge may represent that there is a two-way relationship between a data field in one node and a data field in another node. For example, the ID field of a first node may be mapped to the fromID field in a second node. In addition, the toID field of the second node may be mapped to the ID field of the first node. However, in some embodiments, a bi-directional edge may also be represented as two one-directional edges. A one-directional edge represents a one-way relationship from a data field in one node to a data field in another node, which, in some situations, may mean that data from one data field in one node may be used to match a data field in another node. In some embodiments, the user 254 that creates the table graph 250 may be a system administrator, database administrator, or a database or system developer. In some other embodiments, the user 254 may be an end-user or a user of the table graph system. In some situations, there may be a user that creates the table graph 250 and other users that have access to the table graph 250 or have privileges to edit, remove, and/or execute queries using the table graph 250. In some embodiments, applications may also interact with data access system 252. For example, a data quality monitoring system may need to query a table graph and process the returned results. The application 256 in this example would be the data quality monitoring system. In another example, the application 256 may be a part of an integrated system that detects fraud, security breaches, and so forth, and the application 256 may receive search queries and/or instructions to create and/or configure various table graphs for various purposes.

Figure 3:
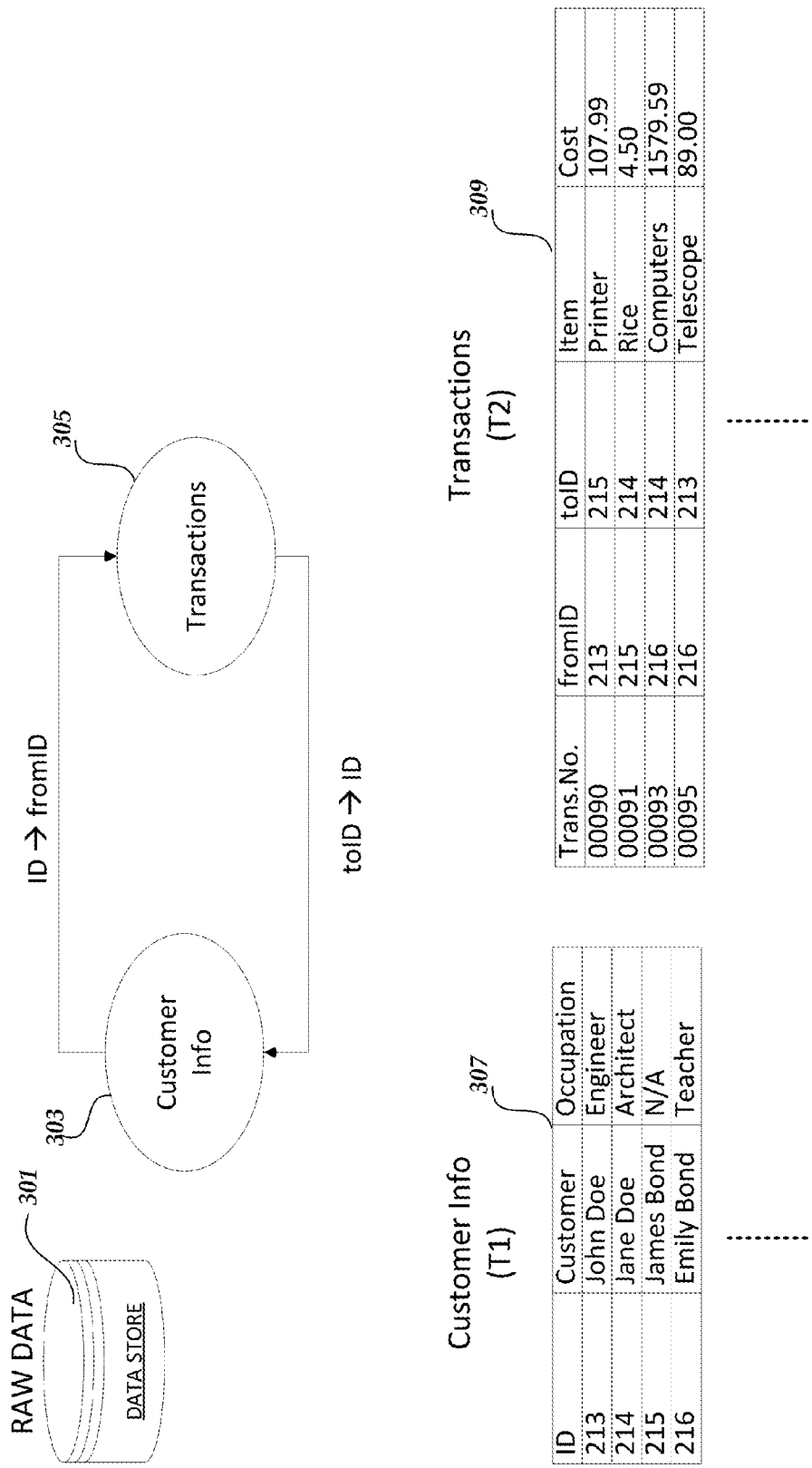
FIG. 3 illustrates one example of executing an example table graph.

FIG. 3 illustrates one example of a process of executing a table graph based on a user-specified request. In this example, two data tables may come from a data store 301 or the data store 301 and another data store in an external data store. The two data tables are example Customer Info 307 and Transactions 309. The two data tables have been added as nodes in the table graph shown in FIG. 3. The customer info node 303 represents the Customer Info data table 307 and the transactions node 305 represents the Transactions data table 309.

As shown in the example in FIG. 3, the Customer Info table 307 (also referred to in FIG. 3 as "T1") includes three data fields: ID, Customer, and Occupation. The ID field is represented in this example as numbers such as 213, 214, 215, etc. The Customer field may store names of the customers, such as "John Doe," "Jane Doe," and "James Bond," and so forth. The Transactions table (also referred to as "T2" in FIG. 3), includes five data fields: Trans. No., fromID, toID, Item, and Cost. The fromID and toID fields in the table represent the identities of the people who are involved in the transaction in a given row in the Transactions table. For example, Trans. No. 90 is a transaction from a person 213 to a person 215 that involves a printer. The printer's cost is $107.99.

Two edges, which can also be represented in some embodiments as a single bi-directional edge, connect the customer info node 303 and the transactions node 305. From the customer info node 303, an edge represents a relationship between the ID field in the customer info node 303 and the fromID field in the transactions node 305. From the transactions node 305, an edge represents a relationship between the toID field in the transactions node 305 and the ID field in the customer info node 303. With the edges establishing table lookups, a user may be able to quickly search for transactions and identities of the people involved in the transactions without performing the intermediate search steps.

Figure 4A:
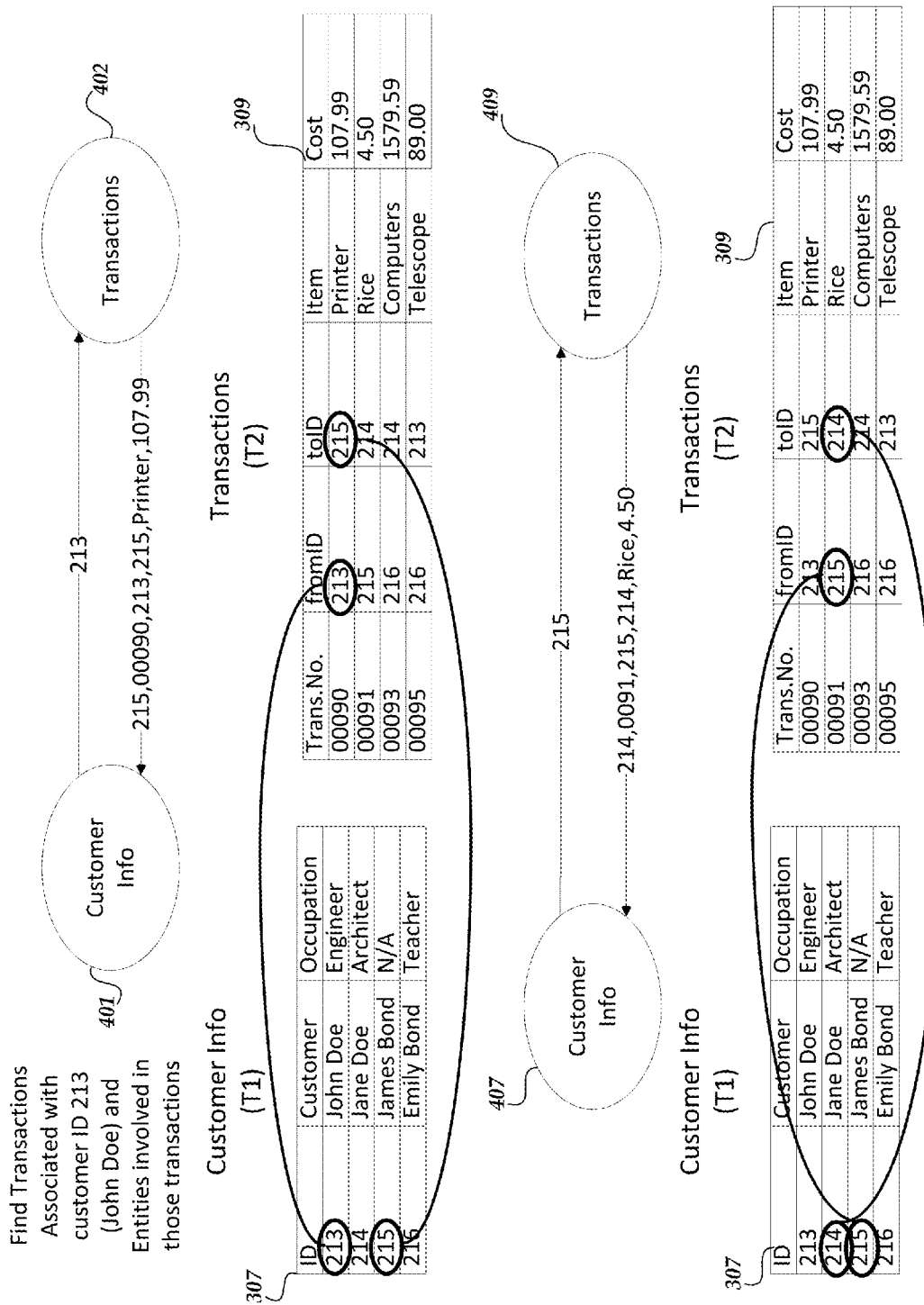
FIG. 4A illustrates two stages of executing the example table graph of FIG. 3 with example data tables.

FIG. 4A illustrates two stages of executing the example table graph of FIG. 3 with example data tables. The same underlying data tables as used in FIG. 3, Customer Info 307 and Transactions 309, are used in this example. For the purposes of clear illustration, the nodes in the table graph are labeled with different reference numbers. The customer info node 401 and transactions node 402 are connected as in FIG. 3, by two edges.

In one example, a user may wish to search for all the transactions from John Doe to James Bond. Traditionally, such a query may have to be carried out in several steps, possibly using different search functionality for different data sources, and/or using a complicated search term.

In the embodiment of FIG. 4A, using a table graph the search may be significantly easier for the user to execute because intermediate steps of parsing query results and making further queries based on previous queries are transparent and hidden from the user. After creating the table graph with the two tables as nodes and edges established between the two tables, queries may be easily carried out. The received search query may be received by the data access system 252 (FIG. 2) and carried out by accessing multiple data sources via the table graph API 248, for example. Because the ID field in the customer info node 401 is linked to the fromID field in the transactions node 401 and the toID field in the transactions node 401 is linked to the ID field of the customer info node 307, the table graph search may be executed directly, which may involve sending over the ID of 213, and receiving a set of transactions satisfying the search criteria (James Bond, which corresponds to toID 215, and the transaction detail: Trans. No. 00090, from ID 213, toID 215, Item printer, Cost $107.99). In some embodiments, the results will be parsed and presented to the user as an object or a set of objects. The user, however, does not need to parse any intermediate results such as searching for the ID related to a name, searching for a name that is related to an ID, or searching for a transaction that is related to the IDs.

In the second stage of the search, the table graph may automatically repeat the table graph using the customer information returned from a previous execution of the table graph, such as to not only find transactions initiated by James Bond, but to also find transactions initiated by others involved in transactions with James Bond. Traditionally, such a query may have to be carried out in several steps or using a complicated search term. Through the use of the table graph, rather than the user needing to parse the results and find out that the toID of the transaction involving James Bond (fromID 215) is 214, and then executing queries of the various tables to find transactions involving ID 214, the recursive searching according to the table graph arrangement is automated. For example, the customer ID of 215 returned in the first stage (top half of FIG. 4A) of the search, which corresponds to James Bond, may be used in a second execution of the table graph (bottom half of FIG. 4A) in order to receive a set of transactions satisfying the search criteria (Jane Doe, which corresponds to ID 214, and the transaction detail: Trans. No. 00091, from ID 215, toID 214, Item rice, Cost $4.50). In some embodiments, the results will be parsed and presented to the user as an object or a set of objects. Such recursive execution of table lookups (and other features) are easily implemented using table graphs.

Figure 4B:
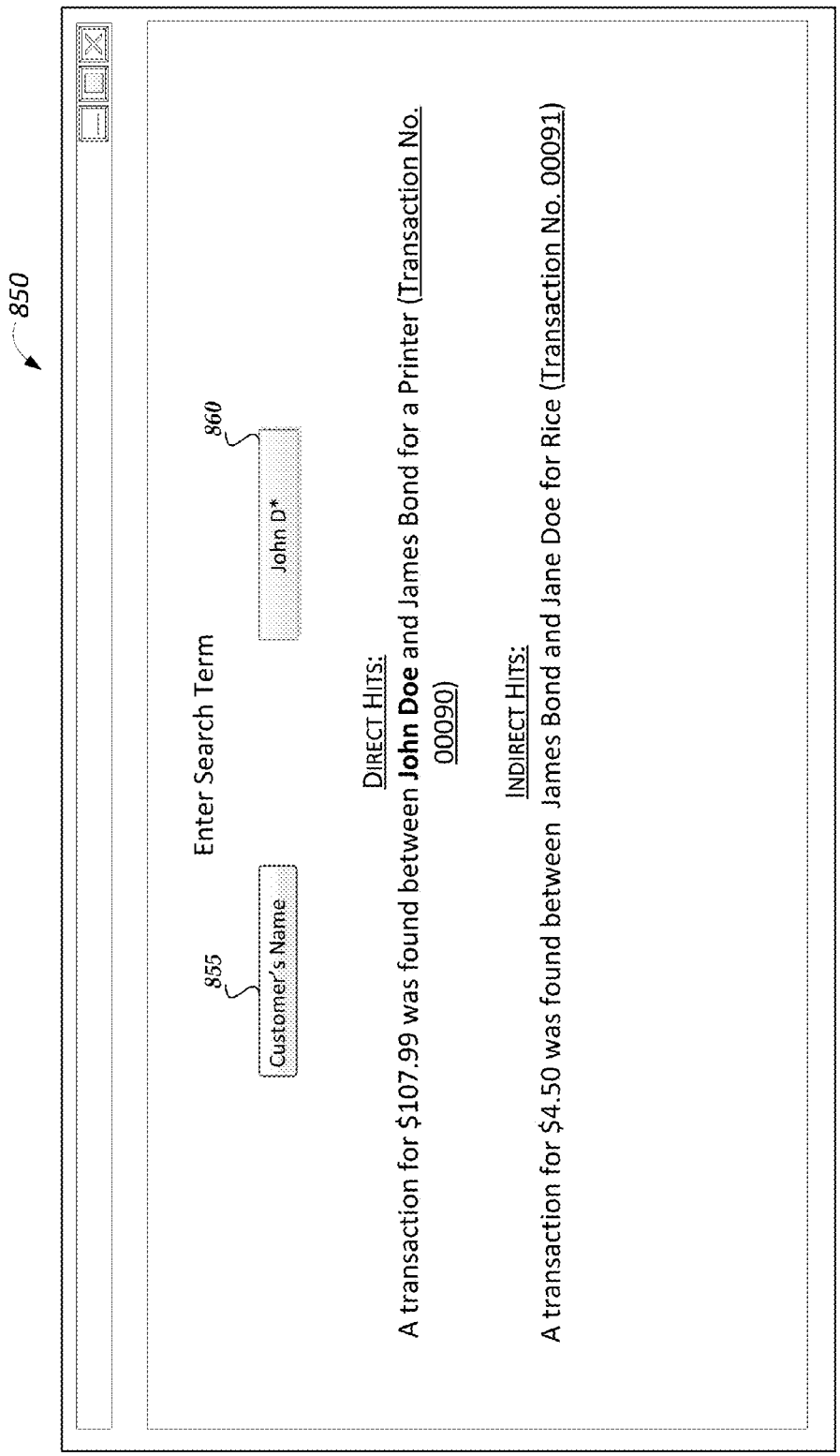
FIG. 4B illustrates an example interface for entering search terms for a search that is executed using one or more table graphs.

FIG. 4B illustrates an example interface for entering search term for a search that is executed using a table graph. The example user interface 850 may be generated and presented to a user, such as a data analyst that wishes to find data on a certain data object, including multiple levels of interactions with the data object that may be indicated in various data tables of various formats. In the example user interface 850, the field to be searched is Customer's Name, as shown in text field 855. The specific query includes the following search term: John D*, which the user may enter in the search box 860. The wildcard "*" represents that any character may be deemed a match. For example, a customer's name that is "John Doe" and a customer's name that is "John Davis" both satisfy this search criteria.

Figure 8:
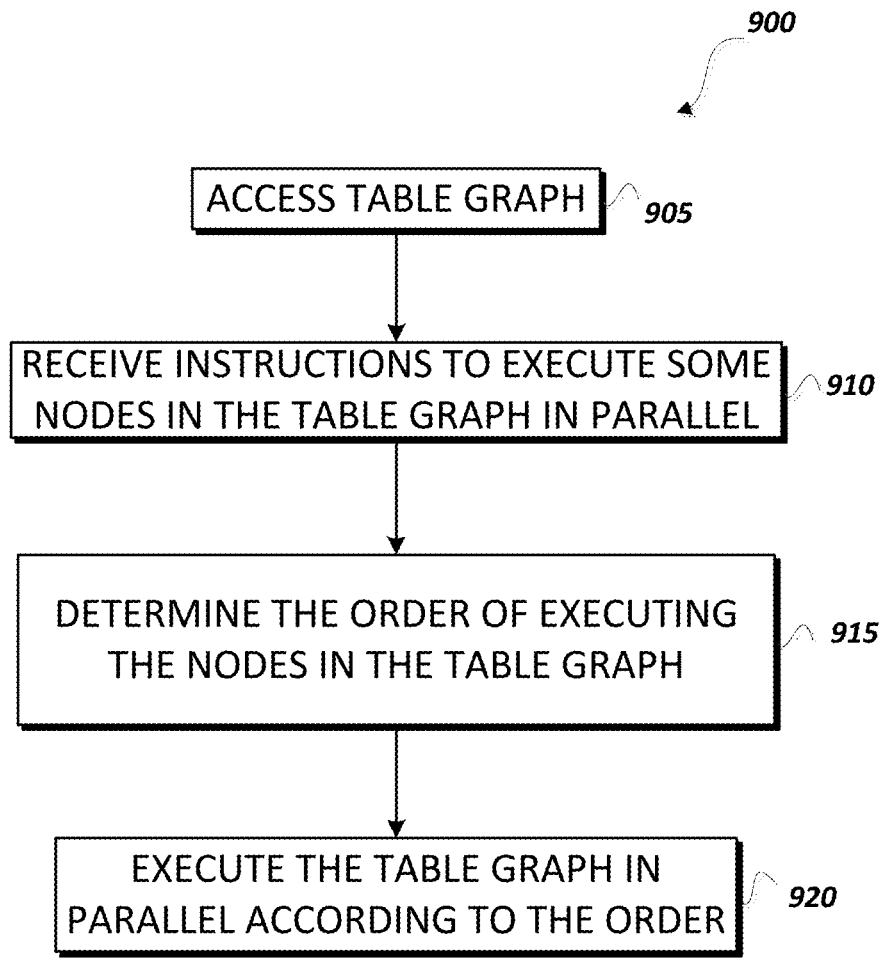
FIG. 8 is a flowchart depicting an illustrative process of executing select nodes of a table graph in parallel.

Depending on the embodiment, results of a search may be displayed in the example user interface 850 or in a separate interface. For purposes of illustration, FIG. 8 illustrates search results that may be returned by executing the table graph of FIGS. 3-4 (although additional results may be obtained if recursive execution of the table graph is continued). In the example as shown, a direct hit is displayed: "A transaction for $107.99 was found between John Doe and James Bond for a Printer (Transaction No. 00090)." In addition, an indirect hit (e.g., a transaction of an indication associated with John D*, rather than John D* himself) may also be displayed, such as the one in the example user interface 850: "A transaction for $4.50 was found between James Bond and Jane Doe for Rice (Transaction No. 00091)." In this example, the indirect hit may be found by the search because John Doe has transacted with James Bond, who also transacted with Jane Doe.

In some embodiments, instead of displaying search results in formatted text, the user interface 850 may display all or a subset of the search results as data field values, unparsed results, objects, and/or files. The results may also be offered as downloadable files formatted in various ways for the convenience of the user.

Example Table Graph Methods

Figure 5A:
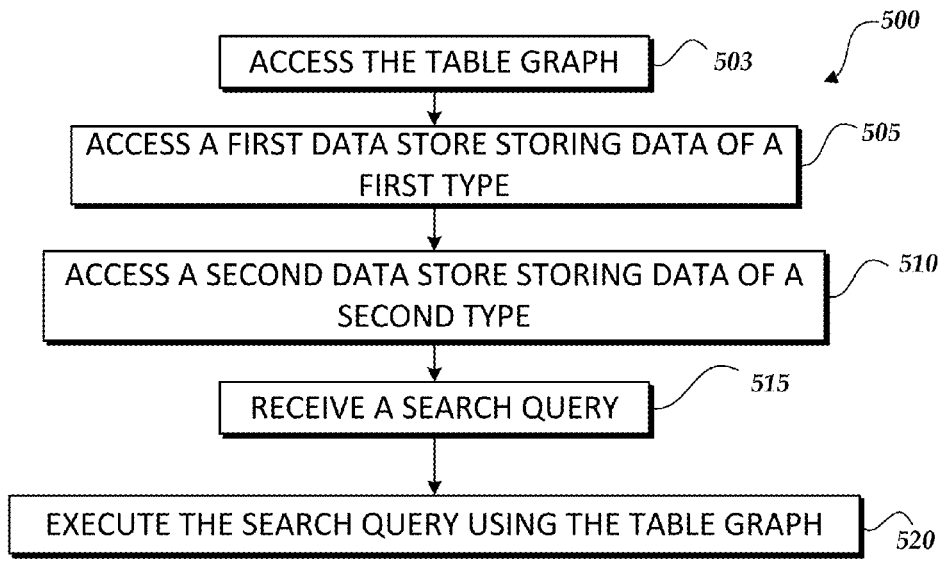
FIG. 5A is a flowchart depicting an illustrative process of executing a search using a table graph.

FIG. 5A is a flowchart depicting an illustrative process of executing a search using a table graph. The process of FIG. 5A may be performed by the data access system 252 and/or the API 248 in response to input from a data analyst, for example, such as part of a data analysis software platform. However, the process may be performed by other computing systems. Depending on the embodiment, the method of FIG. 5A may include fewer or additional blocks and the blocks may be performed in an order that is different than illustrated.

The process 500 begins at block 503, wherein the data access system 252 accesses a table graph, such as a table graph selected by the user or a default table graph associated with a particular search functionality that the user wishes to perform (whether or not the user even knows that table graphs are being used to execute the search functionality). For purposes of the example in FIG. 5A, a table graph having two nodes (such as in FIGS. 3-4) is assumed, although table graphs may include any quantity of nodes in various configurations. In some embodiments, accessing the table graph may also include obtaining information regarding the nodes and edges in the table graph, such as the names, properties, relations, index types, and data fields involved in the nodes and edges.

The process 500 then proceeds to block 505 and a first data store storing data of a first type is accessed. Depending on the embodiment, the first data store may be a database of several different types, such as a proprietary database, a SQL database, an elastic search database, an ODBC database, a JDBC database, an open source database, and so forth. Moreover, the data of the first type as stored in the first data store may be of any type. For example, the data may be of one or more following types: string, float, long, integer, binary, Boolean, text, object, BLOB, BigInt, char, numeric, Date, DateTime, real, SmallInt, Time, Timestamp, Varbinary, Varchar, and so forth. The structure of the data does not need to be specified before the data is accessed. For instance, in some embodiments, if an unknown data structure is encountered, the API 248 may be programmed to analyze and find out the data structure. In some embodiments, the API 248 may notify an administrator or user that an unknown data structure is encountered and receive the administrator or user's instructions.

The process 500 then proceeds to block 510 and a second data store storing data of a second type is accessed. The second data store may be a data store that is either internal or external to the first data store. For example, the second data store may be a database maintained by the same or a different organization at a different location as the first data store. Moreover, the second data store may store data that is of a different type than the first store. For example, if the first data store is a SQL database, the second data store may be a database of a proprietary type, and the two data stores may or may not be able to directly share query terms with each other. For example, the first data store may be a data store maintained by Company A that stores information related to consumers, including their names, identities, and so forth. The first data store may be implemented as a MySQL database. The second data store may be a data stored maintained by a department store B. The second data store may use the Microsoft Access format to store its transaction information related to department store customer transactions. In some embodiments, the first and second data stores are not accessed (blocks 505, 510) until data is actually requested from the data stores, such as when the table graph is executed (block 520).

The process 500 then proceeds to block 515 and a search query is received. In some embodiments, the search query may be submitted by a user through an application. In some other embodiments, the user may directly interact with a table graph system. The search query may be processed by the data access system 252, which interacts with the table graphs and may be further be in contact with the table graph API 248 in order to access the various data sources.

The process 500 then proceeds to block 520 and the search query may be executed using the table graph. In some embodiments, the data access system 252 and/or the API 248 may analyze the search query to parse information such as the nodes and edges relevant to this search query. The data access system 252 and/or the API 248 may also generate one or more queries to the relevant data stores, which may include information such as search terms, data fields, name of the data tables, etc. Because the one or more queries formatted by the data access system 252 are transparent to the user, the user does not need to specify the various search queries (e.g., the exact query language used by the various data stores), details regarding how to join tables, how to parse intermediate results, or other details regarding the actual search execution. Moreover, as discussed previously, if the search query involves the look up of more than one tables (nodes) and the operation to be performed on one table depends on the intermediate results received from another table, such details may be transparent to the user. The user does not need to parse the intermediate results obtained at each node of the search query.

Figure 5B:
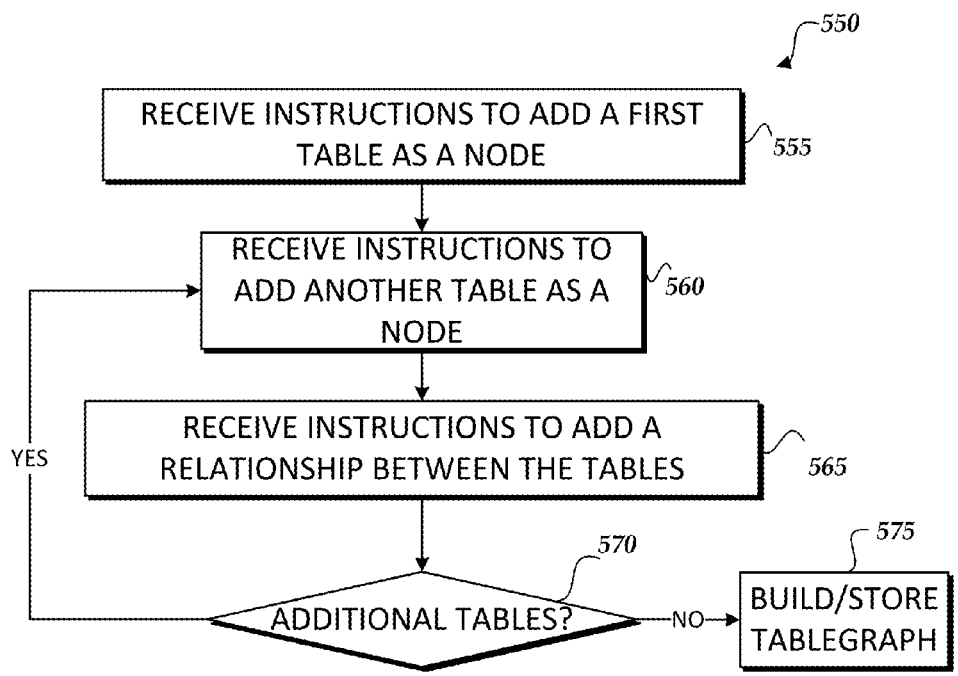
FIG. 5B is a flowchart depicting an illustrative process of generating of a table graph.

FIG. 5B is a flowchart depicting an illustrative process of generating a table graph. The process of FIG. 5B may be performed by the data access system 252 by a system administrator or data analyst, for example, such as part of a data analysis software platform. However, the process may be performed by other computing systems. Depending on the embodiment, the method of FIG. 5B may include fewer or additional blocks and the blocks may be performed in an order that is different than illustrated.

For purposes of the example in FIG. 5B, a table graph having two nodes (such as in FIGS. 3-4) is generated, although table graphs may include any quantity of nodes in various configurations. The process 550 begins at block 555, wherein instructions to add a first table as a node are received from a user or an administrator. The first table may be physically located in a database that is remote from the user. Although the word "table" is used, the data in the first table may be in any other data container and/or formatter, either structured or unstructured. For example, data in the table may be in an XML-like format or a user-defined format. The data may also be in a traditional database format, an object-oriented database format, and so forth. In some embodiments, the instructions to add a first table to a table graph as a node may also include additional information such as an alias for the node. For example, an alias for the customer info node 303 (FIG. 3) may be "Domain1.DB1.T1." The received instructions may also include, in some embodiments, information regarding how the data in the first table may be structured.

The process 550 then proceeds to block 560 and instructions to add another table as a node is received. In some embodiments, the additional table that is added to the table graph may be in the same database as the first table. However, in some other instances, the additional table may belong to a database that is not directly related to the first table. It could even be of a type that cannot normally directly communicate with the first table because they might be of different database types.

The process 550 then proceeds to block 565 and instructions to add a relationship between the tables are received. Depending on the embodiment, the received relationship may be of a type that is bi-directional or one-directional. When the received instructions are to create a relationship that is bi-directional, a bi-directional edge between the tables are added to the table graph. In some other embodiments, instead of creating a bi-directional edge, two one-directional edges are created and added to the table graph. The edges between the tables denote the relationship that is added to the table graph. One common type of relationship that may be added between the two nodes in a table graph is a mapping. For example, the ID column in one node may be mapped to the toID column in another node. In another example, the name column in one node may be mapped to the full_name column in another node.

The creation of an edge may not indicate that there is a one-to-one relationship between the data records stored in the two nodes. Instead, a variety of scenarios may exist. For example, the ID column in one node may correspond to the toID column in another node, but there may be multiple records with the same toID values in the other node. Moreover, the ID column in the one node may be sequential, unique, and non-negative integer values. The toID column in the other node may have redundancy and/or non-integer values. Details such as these may be transparent to a user who queries the table graph, which adds to the efficiency and ease of use to the system.

As another example, the name column (or any other field) in one node may contain both first name and last name (or other combinations of data). The full_name column in the other node, however, may have incomplete data records, such as "James B." instead of "James Bond." The edge between these two nodes, therefore, may, based on user request, include an exact mapping of data records in the two nodes, or a mapping that include partial matches or accommodate data ranges, elastic matches, and so forth.

The process 550 then proceeds to a decision block 570 which determines whether additional tables may be added as nodes to the table graph. If the user wishes to add another table as a node to the table graph, then the answer to the question in the decision block 570 is yes. In some embodiments, instructions may be received from an administrator or a user with sufficient privilege to add a plurality of tables as nodes in a table graph, then the answer to the question in the decision block 570 is also yes. Accordingly, the process 550 proceeds to block 560, wherein instructions to add another table as a node in the table graph is received. The process 550 then proceeds to block 565 wherein the computing system receives instructions to add a relationship between nodes in the table graph.

However, if the user does not want to add more nodes to the table graph or if all the tables have been added as nodes as instructed, then the answer to the question in the decision block 570 is no. Accordingly, the process 550 proceeds to block 575, wherein the table graph is built and stored. In some embodiments, the table graph may be built and stored in a local computing device of the user or administrator that creates the table graph, such as in a computer, a tablet device, a handheld device, and so forth. In some other embodiments, the table graph may be built and stored in a remote computing device.

Moreover, building the table graph may include indexing fields (and/or columns) that may be relevant to edges in the table graph and/or fields that should be indexed according to the instruction of a user. For example, in the customer_info node 303 (FIG. 3), an index may be created for the ID column. Depending on the embodiment, various types of indexing methods and indices may be used. In addition, the Customer column may also be indexed.

Depending on the embodiments, the indexing methods used may present full text searchability and matching capability for regular expression and fuzzy matches. For example, instead of requiring an exact match to a customer's name, "James Bond" may be considered a match for a search term "James B". Also, the user may specify that a search should satisfy the requirement of "Jame*B*d", wherein the wildcard represents any character. Additional regular expression type of matching capabilities may also be accommodated and made possible by the indexing methods and/or query techniques used by a table graph.

Moreover, in some embodiments, the edges between the nodes in a table graph are tolerant of data quality issues. For example, instead of "James Bond," a data record in the database may include the name "Jomes Bond" (with a typo in "Jomes"). A fuzzy matching capability may identify this record as potentially the same as "James Bond," and the edge between two tables in which a name field is used as part of a relationship may still identify a data record containing the record "Jomes Bond."

In another example, the table graph may automatically perform record matches in various ways. For example, if a phone number is given as 123-456-7890, this may automatically be matched with other formats for phone numbers such as 123.456.7890, (123) 456-7890, and/or the like.

In one embodiment, nodes and/or edges may be added via command line instructions. For example, a node in a table graph may be added using syntax such as: Node customer=new CustomerNode( ). In another embodiment, a node be also added using syntax such as: graph.addNode (customer). These syntaxes are presented for illustrative purposes only.

Example User Interfaces

Figure 6A:
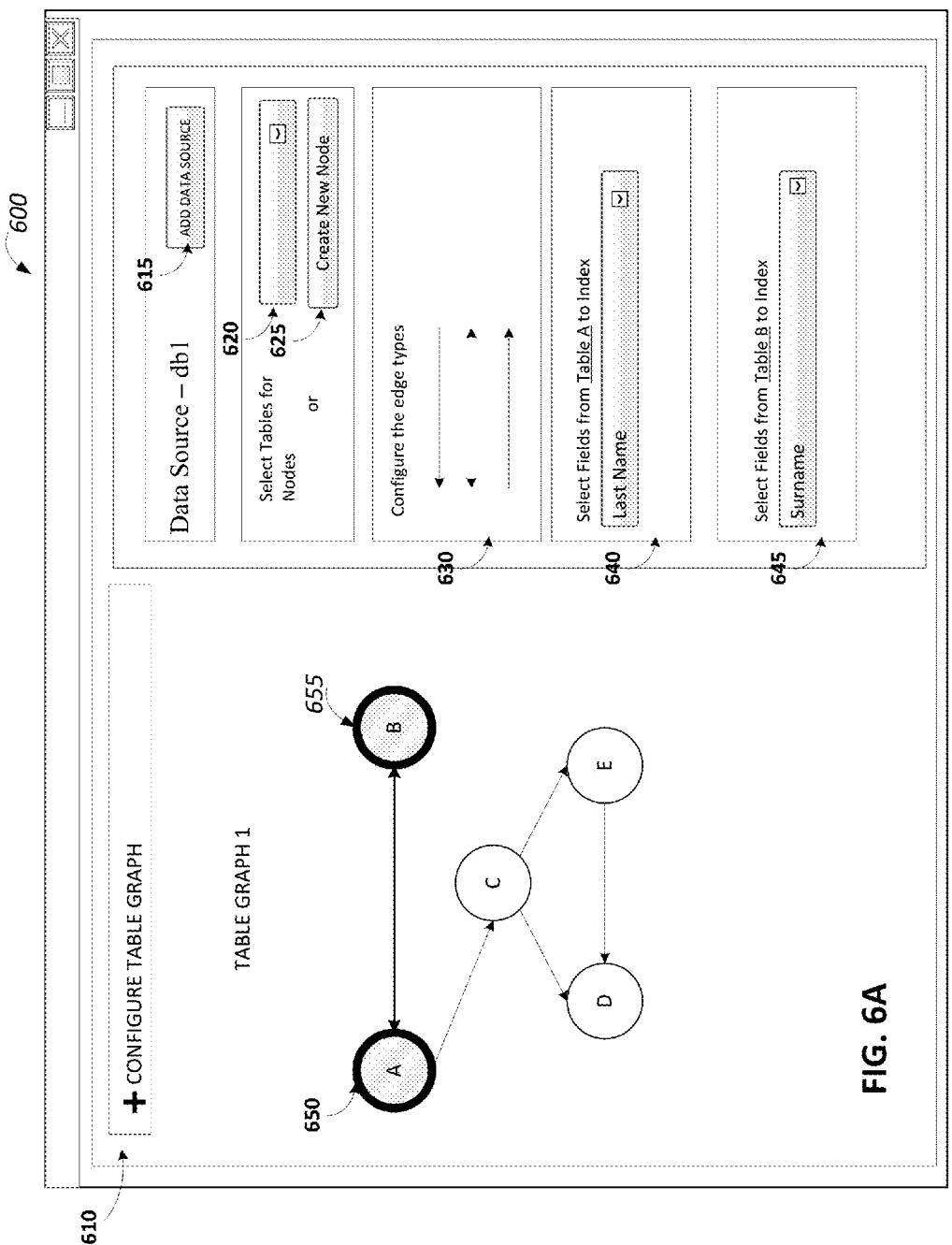
FIG. 6A illustrates an example interface that is configured to enable users to create a table graph and configure properties of the table graph.

FIG. 6A illustrates an example interface that is configured to enable users to create a table graph and configure properties of the table graph. A user interface such as the example user interface 600 may be generated and presented to a user and allow the user to add various data sources by pressing add data sources button 615. As shown in the example interface 600, one data source, db1, has already been added. The user interface 600 may also allow a user to add various tables as nodes by selecting them from a drop-down menu such the drop-down menu 620 and/or some other interface that shows tables available for selection, such as from the one or more selected data sources. Alternatively, the user interface may also allow a user to create a new node directly with the user interface by pressing the create new node button 625. Depending on the embodiment, once the user creates a new node, a new table is created in the underlying data store. By creating a new feature using the new node button 625, the user may conveniently add data to a table graph. For example, while analyzing data regarding James Bond, the user may think of other data that might also be relevant to the analysis, which is not currently in the table graph or in a known data store. Therefore, the user may add the table using the new node button 625. This feature allows users to interact with data in a table graph directly and dynamically, which may help yield more useful analysis results.

The user interface 600 may also allow users to configure the edge types between/among the nodes in the table graph. For example, the example user interface of FIG. 6 shows nodes 650 and 655 selected by the user (indicated by the bold outline of the nodes in this example) such that a relationship between those selected nodes can be created and/or updated. In this example, a user may choose to add a bi-directional edge between node 650 (node "A") and node 655 (node "B") by dragging an edge between two nodes in the table graph. The type of an edge can also be configured and/or edited. For example, a user may choose to change a bi-directional edge into a one-directional edge. A user may also remove an existing edge.

The user interface 600 may also allow a user to select certain fields to index in order to complete the configuration of an edge. For example, the edge between nodes A 650 and B 655 may be configured to be between the "Last Name" field in node A 650 and the "Surname" field in node B 655. In the example of FIG. 6, with nodes 650 and 655 selected, drop down menus 640 and 645 are populated with fields of the respective tables (associated with nodes 650 and 655) such that the user can selected corresponding index nodes of the two tables. For example, a user may choose to change the relationship between the two nodes by choosing the appropriate data field in a drop down menu 640 (for node A 650) and the drop down menu 645 (for node B 645). In some other embodiments, other types of interface elements may be generated and presented in order for users to choose the data fields to index.

Figure 6B:
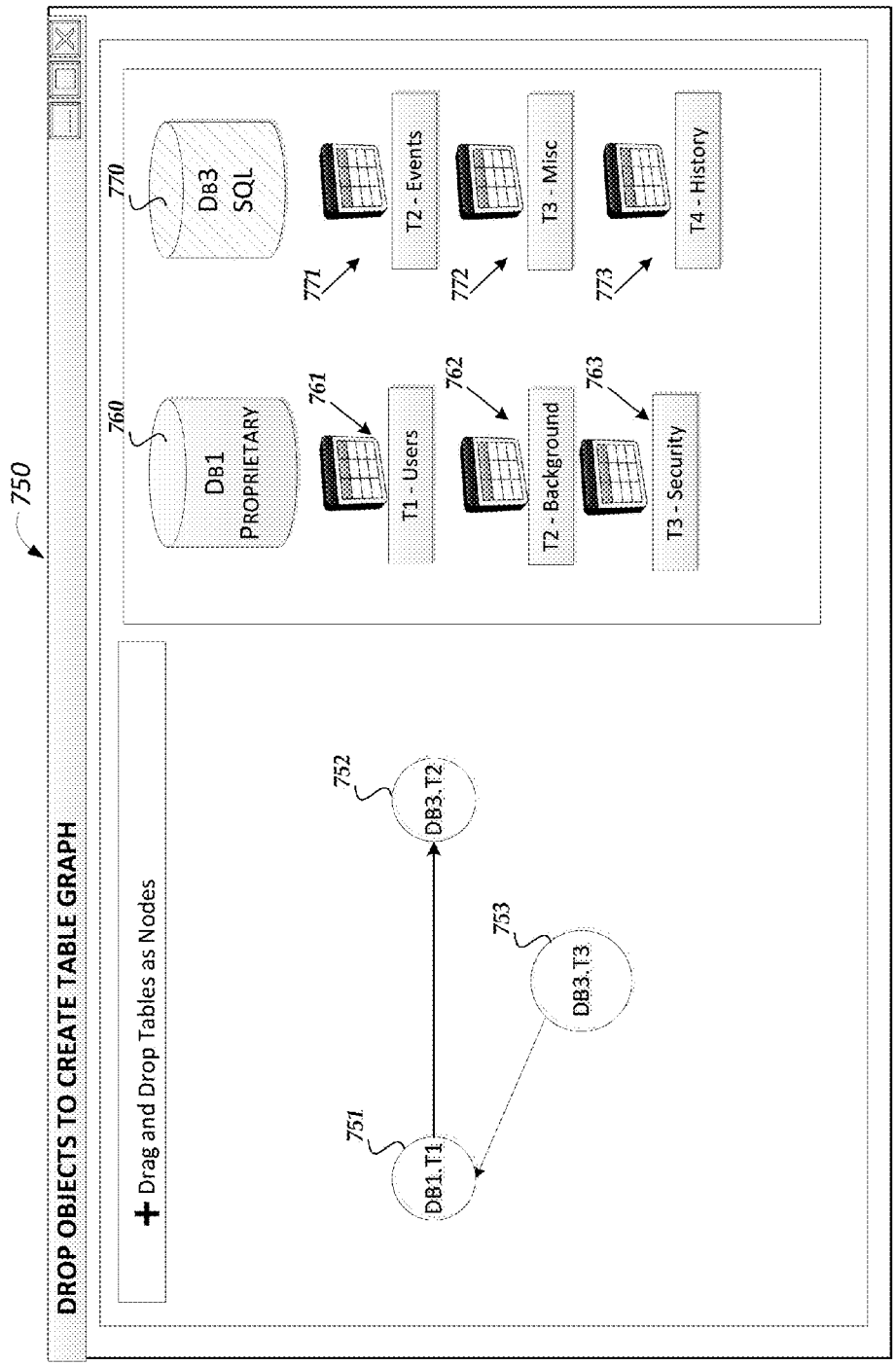
FIG. 6B illustrates an example interface that is configured to allow users to drag and drop tables from various data sources into the interface in order to create a table graph.

FIG. 6B illustrates another example interface that is configured to allow users to drag and drop tables from various data sources into the interface to create a table graph. The example user interface 750 may be generated and presented to a user, such as an administrator and/or analyst that wishes to develop multi-source search logic. The example user interface 750, as shown, illustrates representations of two separate data stores: DB1 760, which is a proprietary database, and DB3 770, which is a SQL database. As shown, three tables from DB1 760 are available for selection as nodes in a table graph: T1 761 (User table), T2 762 (Background table), and T3 763 (Security table). In addition, three tables from DB3 770 are available for selection as nodes in the table graph: T2 771 (Events), T3 772 (Misc.), and T4 773 (History).

In some embodiments, if a user wishes to add a data table as a node into an existing or a new table graph, the user may drag a table and drop it into the table graph, at which time the table is inserted as a node in the table graph. In the example user interface 750, a user has dragged and dropped three tables as nodes into the table graph: node 751 (DB1.T1), node 752 (DB3.T2), and node 753 (DB3.T3). Edges may also be added between the tables. A user may also click on an edge and create indices on the tables and make further configurations as to the mapping between data fields in the nodes.

Figure 7:
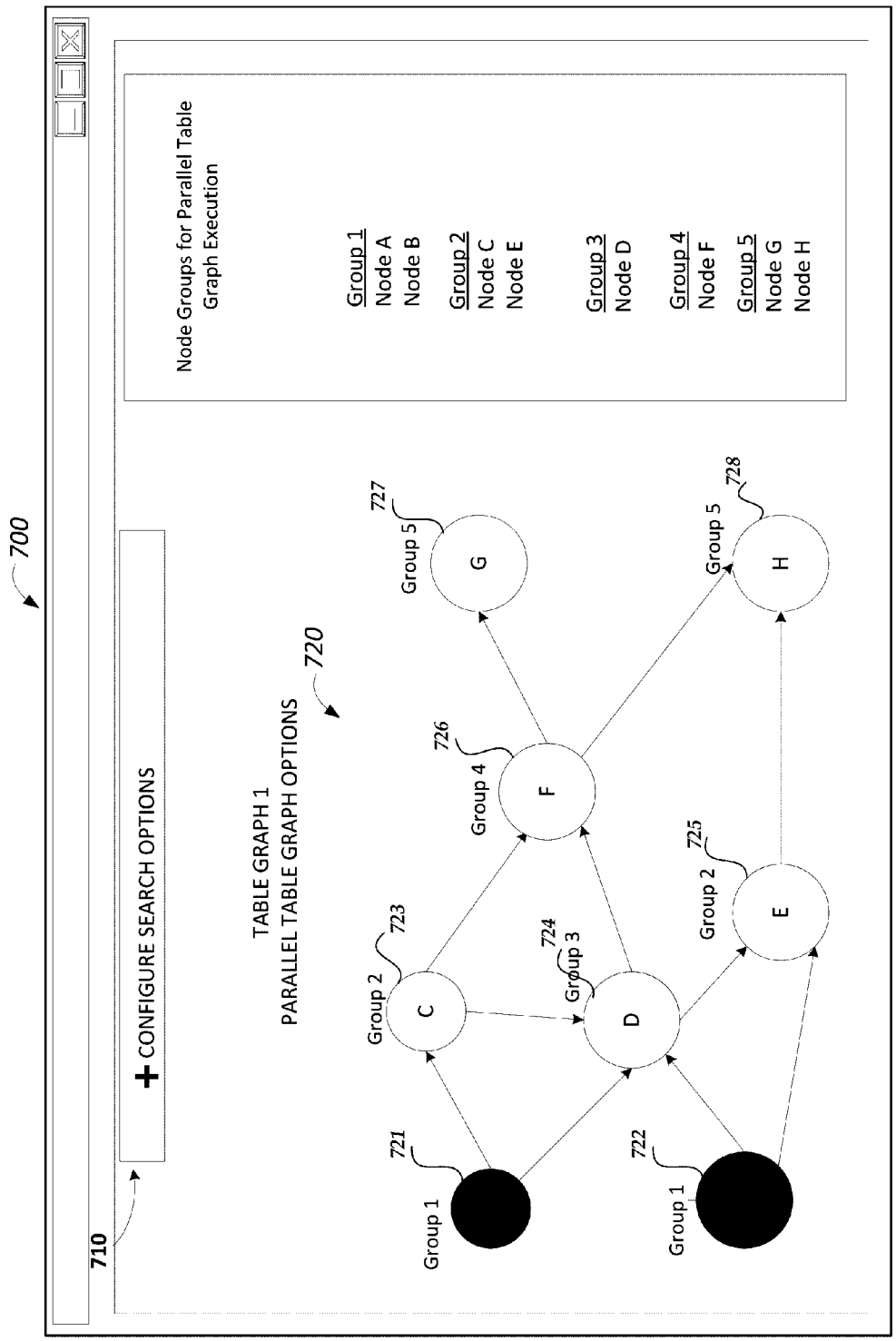
FIG. 7 illustrates an example interface that displays a table graph that includes nodes that can be executed in parallel.

FIG. 7 illustrates an example user interface 700 that displays a table graph that includes nodes that can be executed in parallel. In this example the displayed table graph 720 includes a total of eight nodes, several of which are configured to execute concurrently with certain other nodes, as discussed below.

A table graph that includes at least two nodes that are configured to be executed in parallel may be called a parallel table graph. In some embodiments, one or more nodes in a table graph may be included in a group so that searches related to the nodes in the group may be executed in parallel, making the searches even more efficient. For instance, in the example table graph 720, the nodes may be grouped automatically (and/or manually) into five different groups. In this example, Group 1 includes node A 721 and node B 722. Group 2 includes node C 723 and node E 725. Group 3 only includes one node, which is node D 724. Group 4 includes only one node, node F 726. Finally, group 5 includes two nodes, node G 727 and node H 728. In one embodiment, the nodes that belong to the same group may be executed in parallel because the search queries involving each of these nodes may be configured to be executed independently.

In some instances, there could be more than one way to partition a table graph into multiple groups. A table graph may be partitioned into several sub graphs in multiple ways. Therefore, besides automatically grouping several nodes together into one group, a user may choose to alter the grouping of nodes (e.g., an automatic grouping provided by the table graph generation software) for a parallel table graph for reasons of execution efficiency, data quality, and so forth. A user may utilize an interface such as the example user interface 700 and edit the existing grouping of nodes for parallel table graph execution. If, after the user's configuration, certain nodes assigned into the same group by the user cannot be executed in parallel, the example user interface 700 may display a warning message to the user and let the user know that the current assignment of nodes into a group would not result in a viable parallel table graph execution.

The following is an example of parallel table graph execution: Suppose a parallel table graph includes 3 tables/ nodes including Table 1 that links a customer name to a customer ID, Table 2 that links a customer ID to a phone number, and Table 3 that links a customer ID to an address. In a search for a customer name, an initial search of Table 1 may be performed. However, one a customer ID corresponding to the customer name is determined, a parallel search of Tables 2 and 3 may be performed. Accordingly, in this example, a parallel table graph execution may be performed automatically on nodes corresponding to Tables 2 and 3.

FIG. 8 is a flowchart depicting an illustrative process of executing a parallel table graph (e.g., a table graph with at least two nodes configured to execute at least partially concurrently). The process of FIG. 8 may be performed by the data access system 252 and/or the API 248 in response to input from a data analyst, for example, such as part of a data analysis software platform. However, the process may be performed by other computing systems. Depending on the embodiment, the method of FIG. 8 may include fewer or additional blocks and the blocks may be performed in an order that is different than illustrated.

The process 900 begins at block 905, wherein a table graph is accessed. Accessing a table graph may include receiving information regarding the edges and nodes in the table graph and the data fields that may be involved in the edges and nodes.

The process 900 proceeds to block 910 and instructions regarding executing some nodes in the table graph in parallel are received. As discussed previously, the instructions to execute certain nodes in parallel may be received from a user and/or automatically determined. In some other embodiments, such instructions may be received from an application or a physical computing device that have instructions stored on it to execute a search query using a table graph. For example, an application that interacts with a table graph regularly, such as a program that periodically queries a table graph and reports updated results, may include instructions to query the table graph in parallel. A user or an administrator may set up such instructions as part of the application. Alternatively, the table graph system may automatically determine that particular nodes may be queried in parallel, and may automatically execute the particular nodes in parallel when a search query is received.

The process 900 then proceeds to block 915, and the order of executing the nodes in the table graph are determined. Depending on the embodiments, the determination may be made automatically based on the dependencies of the search queries and/or other factors, such as expected time for executing a query, the complexity of a query, records of past search query execution duration, amount of data potentially involved in a search query/or in a node, database usage statistics, search demand predictions, and so forth. The factors may further be weighted in order to plan the search queries in a cost-effective way. For example, queries that may be repeated periodically can be scheduled to take place at certain times when the demand on a database server is low. In another example, nodes involved in search queries that, according to statistics, may take a long time to finish, may be executed with more priority than other search nodes involving other nodes, even if both could be executed in parallel.

In some other embodiments, the determination of the order of executing the nodes may also be made by a user, who may arrange the order of executing the nodes by assigning certain nodes into the same or various different execution stages and/or groups. Also, depending on the embodiment, the determination may be made by a combination of user input and automatic determination. A user may modify the automatic parallel table graph execution arrangement. A user's parallel table graph execution arrangement may undergo sanity checks performed automatically or as part of a program.

The process 900 then proceeds to block 920 and at least some of the nodes in the table graph are executed in parallel according to the determined order. In some embodiments, a user interface may also be executed and created to the user so that the user may monitor the execution of the table graph as it happens. In some other embodiments, performance statistics may be gathered for the table graph search in order to further optimize future parallel table graph searches.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
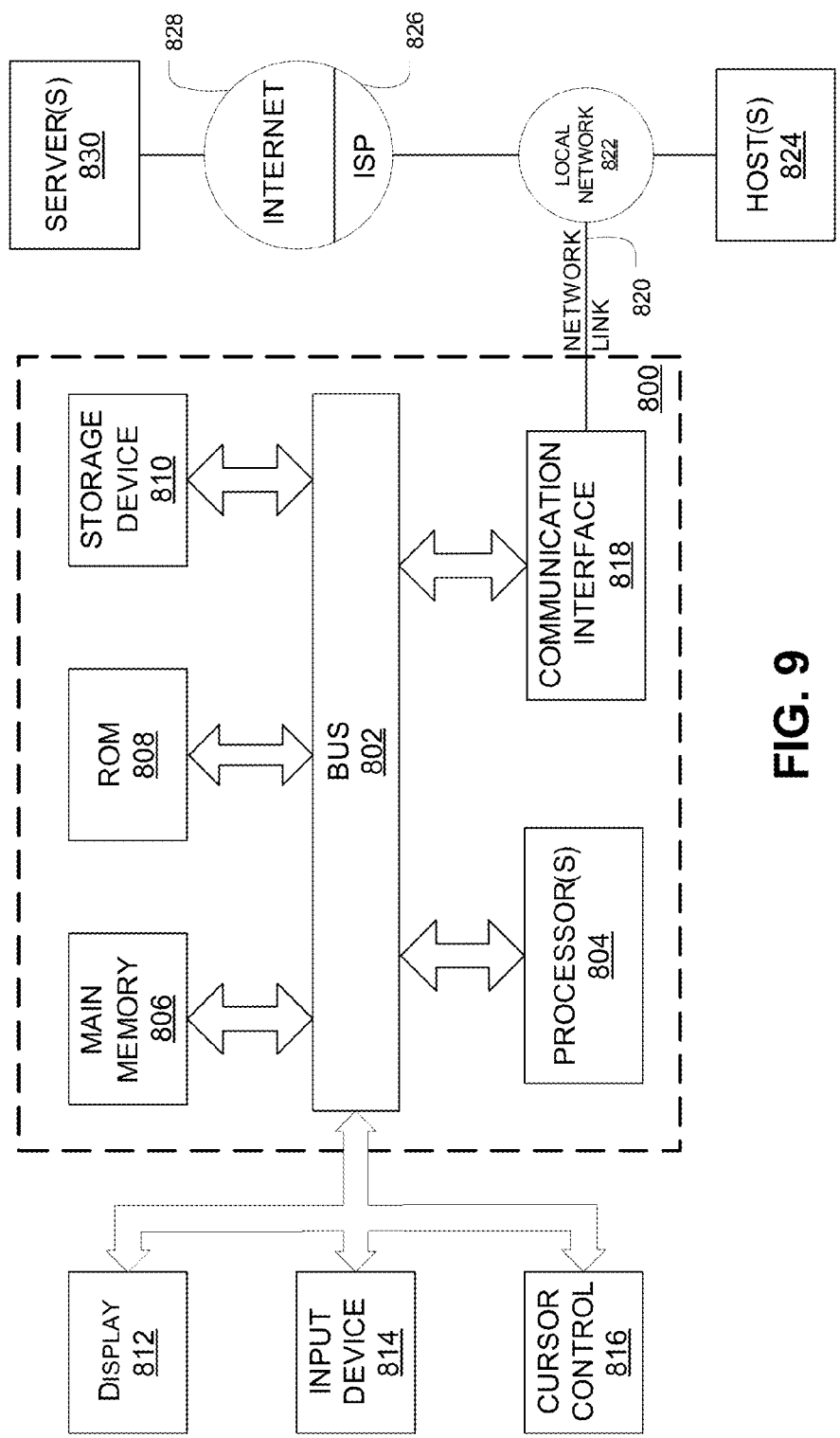
FIG. 9 is a block diagram illustrating one embodiment of a computer system with which certain methods and modules discussed herein may be implemented.

For example, FIG. 9 is a block diagram that illustrates a computer system 800 upon which the processed discussed herein may be implemented. For example, a table graph generation user interface may be generated and displayed to a user by a first computer system 800, while a search query using one or more table graphs may be executed by another computer system 800 (or possibly the same computer system in some embodiments). Furthermore the data sources may each include any portion of the components and functionality discussed with reference to the computer system 800.

The example computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method comprising:
    generating a table graph comprising:
        a first node associated with a first data table;
        a second node associated with a second data table;
        a first link between the first node and the second node, wherein the first link indicates a first field of the first data table is associated with a first field of the second data table; and
        a second link between the first node and the second node, wherein the second link indicates a second field of the first data table is associated with a second field of the second data table;
    executing a search query on the table graph by at least:
        looking up first information in the first data table, wherein the first information is associated with the search query;
        looking up second information in the second data table by reference to the first link, wherein the second information is associated with the first information, and wherein the first and second information together comprise a direct hit of the search query; and
        looking up third information in the first data table by reference to the second link, wherein the third information is different from the first information, and wherein the third information comprises an indirect hit of the search query; and
    providing, for display by a computing device:
        the third information, and
        an indication that the third information comprises the indirect hit of the search query.

2. The method if claim 1, wherein the first data table is stored in a first database and the second table is stored in a second database.

3. The method if claim 2, wherein the first database is of a first type and the second database is of a second type different from the first type.

4. The method if claim 3, wherein the first type comprises at least one of: a relational database, an object-oriented database, a proprietary database, a file-based database, a hierarchical database, a network database, or an elastic-search database.

5. The method if claim 4, wherein the first database and the second database are located remotely from one another.

6. The method if claim 1, wherein the third information and the indication are provided for display in an interactive graphical user interface.

7. The method if claim 1 further comprising:
    displaying, in an interactive graphical user interface and by the computing device, the third information and the indication.

8. The method if claim 1 further comprising:
    providing, for display by the computing device:
        the second information, and
        a second indication that the second information comprises the direct hit of the search query.

9. The method if claim 8, wherein the third information, the indication, the second information, and the second indication are all provided for display in an interactive graphical user interface.

10. The method if claim 9 further comprising:
displaying, in an interactive graphical user interface and by the computing device, all of the third information, the indication, the second information, and the second indication.

11. The method if claim 1, wherein:
the table graph further comprises:
a third node associated with a third data table; and
a third link between the first node and the third node, wherein the third link indicates the first field of the first data table is associated with a first field of the third data table; and
executing the search query on the table graph further includes:
looking up fourth information in the third data table by reference to the third link concurrently with looking up the second information in the second data table, wherein the fourth information is associated with the first information.

12. The method if claim 11, wherein the first, second, and third information together comprise the direct hit of the search query.

13. The method if claim 11 further comprising:
automatically determining that looking up the fourth information is suitable for concurrent execution with looking up the second information based on at least one of: query dependency, query complexity, history of query execution duration, usage statistics of the first, second, and/or third data tables, and/or predicted usage demand of the first, second, and third data tables.

14. The method if claim 13, wherein looking up the fourth information is performed in response to automatically determining that looking up the fourth information is suitable for concurrent execution with looking up the second information.

15. A system comprising:
a first database storing a first data table;
a second database storing a second data table;
a non-transitory computer readable storage medium storing a table graph comprising:
a first node associated with a first data table;
a second node associated with a second data table;
a first link between the first node and the second node, wherein the first link indicates a first field of the first data table is associated with a first field of the second data table; and
a second link between the first node and the second node, wherein the second link indicates a second field of the first data table is associated with a second field of the second data table; and
one or more hardware processors configured to execute software instructions in order to:
execute a search query on the table graph by at least:
looking up first information in the first data table, wherein the first information is associated with the search query;
looking up second information in the second data table by reference to the first link, wherein the second information is associated with the first information, and wherein the first and second information together comprise a direct hit of the search query; and
looking up third information in the first data table by reference to the second link, wherein the third information is different from the first information, and wherein the third information comprises an indirect hit of the search query; and
provide, for display by the system:
the third information, and
an indication that the third information comprises the indirect hit of the search query.

16. The system of claim 15, wherein the first database and the second database are located remotely from one another.

17. The system of claim 16, wherein the first database is of a first type and the second database is of a second type different from the first type.

18. The system of claim 15, wherein the one or more hardware processors configured to execute software instructions in order further to:
provide, for display by the system in an interactive graphical user interface:
the second information,
a second indication that the second information comprises the direct hit of the search query,
the third information, and
the indication.

19. The system of claim 15, wherein:
the table graph further comprises:
a third node associated with a third data table; and
a third link between the first node and the third node, wherein the third link indicates the first field of the first data table is associated with a first field of the third data table; and
executing the search query on the table graph further includes:
looking up fourth information in the third data table by reference to the third link concurrently with looking up the second information in the second data table, wherein the fourth information is associated with the first information.

20. The system of claim 15, wherein the one or more hardware processors configured to execute software instructions in order further to:
automatically determine that looking up the fourth information is suitable for concurrent execution with looking up the second information based on at least one of: query dependency, query complexity, history of query execution duration, usage statistics of the first, second, and/or third data tables, and/or predicted usage demand of the first, second, and third data tables.

* * * * *

UNITED STATES PATENT AND TRADEMARK OFFICE
CERTIFICATE OF CORRECTION

PATENT NO.         : 9,514,200 B2                                           Page 1 of 1
APPLICATION NO.    : 14/815459
DATED              : December 6, 2016
INVENTOR(S)        : Shankar et al.

It is certified that error appears in the above-identified patent and that said Letters Patent is hereby corrected as shown below:

In the Claims

In Column 22 at Line 39, In Claim 2, change "if" to --of--.

In Column 22 at Line 42, In Claim 3, change "if" to --of--.

In Column 22 at Line 45, In Claim 4, change "if" to --of--.

In Column 22 at Line 50, In Claim 5, change "if" to --of--.

In Column 22 at Line 52, In Claim 6, change "if" to --of--.

In Column 22 at Line 55, In Claim 7, change "if" to --of--.

In Column 22 at Line 59, In Claim 8, change "if" to --of--.

In Column 22 at Line 64, In Claim 9, change "if" to --of--.

In Column 23 at Line 1, In Claim 10, change "if" to --of--.

In Column 23 at Line 6, In Claim 11, change "if" to --of--.

In Column 23 at Line 20 (approx.), In Claim 12, change "if" to --of--.

In Column 23 at Line 23 (approx.), In Claim 13, change "if" to --of--.

In Column 23 at Line 31 (approx.), In Claim 14, change "if" to --of--.

Signed and Sealed this
Twenty-eighth Day of March, 2017

Michelle K. Lee
*Director of the United States Patent and Trademark Office*